US011592423B2

United States Patent
Munemoto et al.

(10) Patent No.: US 11,592,423 B2
(45) Date of Patent: Feb. 28, 2023

(54) ADAPTIVE ULTRASONIC SENSING TECHNIQUES AND SYSTEMS TO MITIGATE INTERFERENCE

(71) Applicant: QEEXO, CO., Mountain View, CA (US)

(72) Inventors: Taihei Munemoto, Pittsburgh, PA (US); Leslie J. Schradin, III, Pittsburgh, PA (US)

(73) Assignee: QEEXO, CO., Mountain View, CA (US)

( * ) Notice: Subject to any disclaimer, the term of this patent is extended or adjusted under 35 U.S.C. 154(b) by 0 days.

(21) Appl. No.: 16/776,399

(22) Filed: Jan. 29, 2020

(65) Prior Publication Data

US 2021/0231615 A1 Jul. 29, 2021

(51) Int. Cl.
*G01N 29/036* (2006.01)
*G01N 29/44* (2006.01)
(Continued)

(52) U.S. Cl.
CPC .......... *G01N 29/036* (2013.01); *G01N 29/12* (2013.01); *G01N 29/4463* (2013.01);
(Continued)

(58) Field of Classification Search
CPC ................. G01N 29/036; G01N 29/12; G01N 29/4463; G06F 3/043; G06F 3/04182
See application file for complete search history.

(56) References Cited

U.S. PATENT DOCUMENTS

| 2,008,028 | A | 7/1935 | McCortney |
| 2,430,005 | A | 11/1947 | Denneen |
| 3,354,531 | A | 11/1967 | Pryor |
| 4,561,105 | A | 12/1985 | Crane |
| 4,597,932 | A | 7/1986 | Kurihara |
| 4,686,332 | A | 8/1987 | Greanias |

(Continued)

FOREIGN PATENT DOCUMENTS

| CN | 1797305 A | 7/2006 |
| CN | 1928781 A | 3/2007 |

(Continued)

OTHER PUBLICATIONS

"Making it Easier to Share With Who You Want," Facebook, Aug. 23, 2011, last updated on Dec. 12, 2012 retrieved from https://www.facebook.com/notes/facebook/making-it-easier-to-share-with-who-you-want/10150251867797131/, retrieved on Jun. 1, 2018, 14 pages.

(Continued)

Primary Examiner — Helen C Kwok
(74) Attorney, Agent, or Firm — Kwan & Olynick LLP

(57) ABSTRACT

Disclosed are apparatus and methods for enhancing operation of an ultrasonic sensing device for determining the status of an object near such ultrasonic sensing device. From the ultrasonic sensing device, an emission signal having a current frequency or band in an ultrasonic frequency range is emitted. Ultrasonic signals are received and analyzed to detect one or more objects near or contacting the ultrasonic sensing device. After expiration of a predefined time period of emitting the emission signal, a background noise signal is detected from an environment of the ultrasonic device and background noise metrics are estimated based on the background noise signal. It is then determined whether the current frequency of the emission signal is optimized based on the background noise metrics. A next frequency or band is selected and the emission signal is emitted at the next (Continued)

frequency or band if it is determined that the current frequency or band is not optimum. The operations of detecting, estimating, determining, and selecting are repeated after each time a next frequency or band is selected and the emission signal is emitted at such next frequency or band.

21 Claims, 10 Drawing Sheets

(51) Int. Cl.
    *G01N 29/12* (2006.01)
    *G06F 3/043* (2006.01)
    *G06F 3/041* (2006.01)
    *H04B 11/00* (2006.01)

(52) U.S. Cl.
    CPC .......... *G06F 3/043* (2013.01); *G06F 3/04182* (2019.05); *H04B 11/00* (2013.01)

(56) References Cited

U.S. PATENT DOCUMENTS

| | | | |
|---|---|---|---|
| 5,483,261 A | 1/1996 | Yasutake | |
| 5,544,265 A | 8/1996 | Bozinovic | |
| 5,596,656 A | 1/1997 | Goldberg | |
| 5,615,285 A | 3/1997 | Beernink | |
| 5,625,818 A | 4/1997 | Zarmer | |
| 5,666,438 A | 9/1997 | Beernink | |
| 5,867,163 A | 2/1999 | Kurtenbach | |
| 5,933,514 A | 8/1999 | Ostrem | |
| 6,028,593 A | 2/2000 | Rosenberg | |
| 6,118,435 A | 9/2000 | Fujita | |
| 6,208,330 B1 | 3/2001 | Hasegawa | |
| 6,212,295 B1 | 4/2001 | Ostrem | |
| 6,222,465 B1 | 4/2001 | Kumar | |
| 6,246,395 B1 | 6/2001 | Goyins | |
| 6,252,563 B1 | 6/2001 | Tada | |
| 6,313,825 B1* | 11/2001 | Gilbert | G06F 3/011 345/156 |
| 6,323,846 B1 | 11/2001 | Westerman | |
| 6,337,698 B1 | 1/2002 | Keely, Jr. | |
| 6,492,979 B1 | 12/2002 | Kent | |
| 6,504,530 B1 | 1/2003 | Wilson | |
| 6,643,663 B1 | 11/2003 | Dabney | |
| 6,707,451 B1 | 3/2004 | Nagaoka | |
| 6,748,425 B1 | 6/2004 | Duffy | |
| 6,772,396 B1 | 8/2004 | Cronin | |
| 6,933,930 B2 | 8/2005 | Devige | |
| 6,943,665 B2 | 9/2005 | Chornenky | |
| 7,024,548 B1 | 4/2006 | O'Toole, Jr. | |
| 7,050,955 B1 | 5/2006 | Carmel | |
| 7,084,884 B1 | 8/2006 | Nelson | |
| 7,098,896 B2 | 8/2006 | Kushler | |
| 7,212,197 B1 | 5/2007 | Schkolne | |
| 7,443,396 B2 | 10/2008 | Ilic | |
| 7,581,194 B2 | 8/2009 | Iwema | |
| 7,982,724 B2 | 7/2011 | Hill | |
| 8,086,971 B2 | 12/2011 | Radivojevic | |
| 8,144,126 B2 | 3/2012 | Wright | |
| 8,154,524 B2 | 4/2012 | Wilson | |
| 8,154,529 B2 | 4/2012 | Sleeman | |
| 8,170,346 B2 | 5/2012 | Ludwig | |
| 8,199,126 B1 | 6/2012 | Taubman | |
| 8,253,744 B2 | 8/2012 | Macura | |
| 8,269,744 B2 | 9/2012 | Agari | |
| 8,327,029 B1 | 12/2012 | Purser | |
| 8,441,790 B2 | 5/2013 | Pance | |
| 8,547,357 B2 | 10/2013 | Aoyagi | |
| 8,624,878 B2 | 1/2014 | Sarwar | |
| 8,670,632 B2 | 3/2014 | Wilson | |
| 8,674,943 B2 | 3/2014 | Westerman | |
| 8,743,091 B2 | 6/2014 | Bernstein | |
| 8,760,395 B2 | 6/2014 | Kim | |
| 8,762,332 B2 | 6/2014 | Keebler | |
| 8,769,524 B2 | 7/2014 | Bhullar | |
| 8,890,818 B2 | 11/2014 | Arrasvuori | |
| 9,013,452 B2 | 4/2015 | Harrison | |
| 9,019,244 B2 | 4/2015 | Harrison | |
| 9,030,498 B2 | 5/2015 | Galor | |
| 9,052,772 B2 | 6/2015 | West | |
| 9,060,007 B2 | 6/2015 | Keebler | |
| 9,152,306 B2 | 10/2015 | Anderson | |
| 9,182,882 B2 | 11/2015 | Fowler | |
| 9,329,688 B2 | 5/2016 | Harrison | |
| 9,329,715 B2 | 5/2016 | Schwarz | |
| 9,377,863 B2 | 6/2016 | Bychkov | |
| 9,557,852 B2 | 1/2017 | Tsai | |
| 9,612,689 B2 | 4/2017 | Harrison | |
| 9,696,859 B1 | 7/2017 | Heller | |
| 9,864,453 B2 | 1/2018 | Munemoto | |
| 10,082,935 B2 | 9/2018 | Harrison | |
| 10,642,370 B2 | 5/2020 | Børstad | |
| 10,726,167 B2* | 7/2020 | Santarone | G06F 30/13 |
| 11,009,989 B2* | 5/2021 | Munemoto | G06F 3/0416 |
| 11,231,815 B2* | 1/2022 | Munemoto | G06F 3/03545 |
| 2002/0009227 A1 | 1/2002 | Goldberg | |
| 2002/0057837 A1 | 5/2002 | Wilkinson | |
| 2002/0070927 A1 | 6/2002 | Fujitsuka | |
| 2002/0126161 A1 | 9/2002 | Kuzunuki | |
| 2003/0048260 A1 | 3/2003 | Matusis | |
| 2003/0110085 A1 | 6/2003 | Murren | |
| 2003/0132922 A1 | 7/2003 | Philipp | |
| 2003/0217873 A1 | 11/2003 | Paradiso | |
| 2004/0012573 A1 | 1/2004 | Morrison | |
| 2004/0021681 A1 | 2/2004 | Liao | |
| 2004/0054711 A1 | 3/2004 | Multer | |
| 2004/0141010 A1 | 7/2004 | Fitzmaurice | |
| 2004/0160421 A1 | 8/2004 | Sullivan | |
| 2004/0199867 A1 | 10/2004 | Brandenborg | |
| 2004/0225730 A1 | 11/2004 | Brown | |
| 2005/0083313 A1 | 4/2005 | Hardie-Bick | |
| 2005/0131778 A1 | 6/2005 | Bennett | |
| 2005/0146512 A1 | 7/2005 | Hill | |
| 2005/0289461 A1 | 12/2005 | Amado | |
| 2006/0010400 A1 | 1/2006 | Dehlin | |
| 2006/0026535 A1 | 2/2006 | Hotelling | |
| 2006/0031746 A1 | 2/2006 | Toepfer | |
| 2006/0152499 A1 | 7/2006 | Roberts | |
| 2006/0173985 A1 | 8/2006 | Moore | |
| 2006/0184617 A1 | 8/2006 | Nicholas | |
| 2006/0217126 A1 | 9/2006 | Sohm | |
| 2006/0230021 A1 | 10/2006 | Diab | |
| 2006/0241916 A1* | 10/2006 | Sieracki | G10L 15/02 702/19 |
| 2006/0288329 A1 | 12/2006 | Gandhi | |
| 2007/0011205 A1 | 1/2007 | Majjasie | |
| 2007/0044010 A1 | 2/2007 | Sull | |
| 2007/0075965 A1 | 4/2007 | Huppi | |
| 2007/0085157 A1 | 4/2007 | Fadell | |
| 2007/0100959 A1 | 5/2007 | Eichstaedt | |
| 2007/0109279 A1 | 5/2007 | Sigona | |
| 2007/0126716 A1 | 6/2007 | Haverly | |
| 2007/0168367 A1 | 7/2007 | Dickinson | |
| 2007/0186157 A1 | 8/2007 | Walker | |
| 2007/0192674 A1 | 8/2007 | Bodin | |
| 2007/0192910 A1* | 8/2007 | Vu | B25J 9/0003 700/245 |
| 2007/0245020 A1 | 10/2007 | Ott | |
| 2007/0257767 A1 | 11/2007 | Beeson | |
| 2007/0291297 A1 | 12/2007 | Harmon | |
| 2008/0005666 A1 | 1/2008 | Sefton | |
| 2008/0036743 A1 | 2/2008 | Westerman | |
| 2008/0042978 A1 | 2/2008 | Perez-Noguera | |
| 2008/0082941 A1 | 4/2008 | Goldberg | |
| 2008/0103906 A1 | 5/2008 | Singh | |
| 2008/0117168 A1 | 5/2008 | Liu | |
| 2008/0126388 A1 | 5/2008 | Naaman | |
| 2008/0141132 A1 | 6/2008 | Tsai | |
| 2008/0155118 A1 | 6/2008 | Glaser | |
| 2008/0158147 A1 | 7/2008 | Westerman | |
| 2008/0158168 A1 | 7/2008 | Westerman | |
| 2008/0158185 A1 | 7/2008 | Westerman | |
| 2008/0168403 A1 | 7/2008 | Westerman | |

(56) References Cited

U.S. PATENT DOCUMENTS

| | | |
|---|---|---|
| 2008/0180406 A1 | 7/2008 | Han |
| 2008/0244468 A1 | 10/2008 | Nishihara |
| 2008/0288347 A1 | 11/2008 | Sifry |
| 2008/0319932 A1 | 12/2008 | Yih |
| 2009/0025987 A1 | 1/2009 | Perski |
| 2009/0073144 A1 | 3/2009 | Chen |
| 2009/0095540 A1 | 4/2009 | Zachut |
| 2009/0150373 A1 | 6/2009 | Davis |
| 2009/0157206 A1 | 6/2009 | Weinberg |
| 2009/0174679 A1 | 7/2009 | Westerman |
| 2009/0178011 A1 | 7/2009 | Ording |
| 2009/0231275 A1 | 9/2009 | Odgers |
| 2009/0232355 A1 | 9/2009 | Minear |
| 2009/0254869 A1 | 10/2009 | Ludwig |
| 2009/0259628 A1 | 10/2009 | Farrell |
| 2009/0262637 A1 | 10/2009 | Badaye |
| 2009/0315835 A1 | 12/2009 | De Goes |
| 2009/0318192 A1 | 12/2009 | Leblanc |
| 2010/0036967 A1 | 2/2010 | Caine |
| 2010/0060602 A1 | 3/2010 | Agari |
| 2010/0085216 A1 | 4/2010 | Ms |
| 2010/0094633 A1 | 4/2010 | Kawamura |
| 2010/0123666 A1 | 5/2010 | Wickholm |
| 2010/0127997 A1 | 5/2010 | Park |
| 2010/0194703 A1 | 8/2010 | Fedor |
| 2010/0214267 A1 | 8/2010 | Radivojevic |
| 2010/0225601 A1 | 9/2010 | Homma |
| 2010/0251112 A1 | 9/2010 | Hinckley |
| 2010/0265185 A1 | 10/2010 | Oksanen |
| 2010/0271322 A1 | 10/2010 | Kondoh |
| 2010/0274622 A1 | 10/2010 | Kennedy |
| 2010/0279738 A1 | 11/2010 | Kim |
| 2010/0289754 A1 | 11/2010 | Sleeman |
| 2010/0302184 A1 | 12/2010 | East |
| 2010/0306649 A1 | 12/2010 | Russ |
| 2010/0309158 A1 | 12/2010 | Iwayama |
| 2010/0309933 A1 | 12/2010 | Stark |
| 2011/0003550 A1 | 1/2011 | Klinghult |
| 2011/0007000 A1 | 1/2011 | Lim |
| 2011/0018825 A1 | 1/2011 | Kondo |
| 2011/0057670 A1 | 3/2011 | Jordan |
| 2011/0057885 A1 | 3/2011 | Lehtovirta |
| 2011/0074544 A1 | 3/2011 | D Souza |
| 2011/0074701 A1 | 3/2011 | Dickinson |
| 2011/0080349 A1 | 4/2011 | Holbein |
| 2011/0133934 A1 | 6/2011 | Tan |
| 2011/0134063 A1 | 6/2011 | Norieda |
| 2011/0134083 A1 | 6/2011 | Norieda |
| 2011/0141066 A1 | 6/2011 | Shimotani |
| 2011/0145706 A1 | 6/2011 | Wilson |
| 2011/0164029 A1 | 7/2011 | King |
| 2011/0167391 A1 | 7/2011 | Momeyer |
| 2011/0169763 A1 | 7/2011 | Westerman |
| 2011/0169778 A1 | 7/2011 | Nungester |
| 2011/0173235 A1 | 7/2011 | Aman |
| 2011/0175813 A1 | 7/2011 | Sarwar |
| 2011/0175821 A1 | 7/2011 | King |
| 2011/0187652 A1 | 8/2011 | Huibers |
| 2011/0202848 A1 | 8/2011 | Ismalon |
| 2011/0210943 A1 | 9/2011 | Zaliva |
| 2011/0231290 A1 | 9/2011 | Narcisse |
| 2011/0238613 A1 | 9/2011 | Shehory |
| 2011/0246463 A1 | 10/2011 | Carson, Jr. |
| 2011/0246503 A1 | 10/2011 | Bender |
| 2011/0248927 A1 | 10/2011 | Michaelis |
| 2011/0248948 A1 | 10/2011 | Griffin |
| 2011/0261083 A1 | 10/2011 | Wilson |
| 2011/0298798 A1 | 12/2011 | Krah |
| 2011/0310040 A1 | 12/2011 | Ben-Shalom |
| 2012/0001875 A1 | 1/2012 | Li |
| 2012/0007821 A1 | 1/2012 | Zaliva |
| 2012/0007836 A1 | 1/2012 | Wu |
| 2012/0011106 A1 | 1/2012 | Reid |
| 2012/0019562 A1 | 1/2012 | Park |
| 2012/0051596 A1 | 3/2012 | Darnell |
| 2012/0056846 A1 | 3/2012 | Zaliva |
| 2012/0068941 A1* | 3/2012 | Arrasvuori ......... G06F 3/04883 345/173 |
| 2012/0078942 A1 | 3/2012 | Cai |
| 2012/0096041 A1 | 4/2012 | Rao |
| 2012/0113017 A1 | 5/2012 | Benko |
| 2012/0120000 A1 | 5/2012 | Lucic |
| 2012/0131139 A1 | 5/2012 | Siripurapu |
| 2012/0146938 A1 | 6/2012 | Worfolk |
| 2012/0150871 A1 | 6/2012 | Hua |
| 2012/0158629 A1 | 6/2012 | Hinckley |
| 2012/0200517 A1 | 8/2012 | Nikolovski |
| 2012/0206330 A1 | 8/2012 | Cao |
| 2012/0206339 A1* | 8/2012 | Dahl ............... H04N 21/44218 345/156 |
| 2012/0243374 A1* | 9/2012 | Dahl .................. G06F 3/043 367/93 |
| 2012/0262407 A1 | 10/2012 | Hinckley |
| 2012/0274583 A1 | 11/2012 | Haggerty |
| 2012/0280827 A1 | 11/2012 | Kashiwagi |
| 2012/0280927 A1 | 11/2012 | Ludwig |
| 2012/0287056 A1 | 11/2012 | Ibdah |
| 2012/0287076 A1 | 11/2012 | Dao |
| 2012/0313969 A1 | 12/2012 | Szymczyk |
| 2012/0324349 A1 | 12/2012 | Pop-Lazarov |
| 2013/0009896 A1 | 1/2013 | Zaliva |
| 2013/0014248 A1 | 1/2013 | McLaughlin |
| 2013/0027404 A1 | 1/2013 | Sarnoff |
| 2013/0038554 A1 | 2/2013 | West |
| 2013/0091123 A1 | 4/2013 | Chen |
| 2013/0100071 A1 | 4/2013 | Wright |
| 2013/0154919 A1* | 6/2013 | Tan ..................... G06F 3/03 345/156 |
| 2013/0176264 A1 | 7/2013 | Alameh |
| 2013/0176270 A1 | 7/2013 | Cattivelli |
| 2013/0179773 A1 | 7/2013 | Lee |
| 2013/0187883 A1 | 7/2013 | Lim |
| 2013/0215070 A1 | 8/2013 | Sasaki |
| 2013/0234982 A1 | 9/2013 | Kang |
| 2013/0246861 A1 | 9/2013 | Colley |
| 2013/0257757 A1 | 10/2013 | Kim |
| 2013/0265269 A1 | 10/2013 | Sharma |
| 2013/0285942 A1 | 10/2013 | Ko |
| 2013/0287273 A1 | 10/2013 | Huang |
| 2013/0307814 A1 | 11/2013 | Chang |
| 2013/0307828 A1 | 11/2013 | Miller |
| 2013/0316813 A1 | 11/2013 | Derome |
| 2013/0328813 A1 | 12/2013 | Kuo |
| 2013/0335333 A1 | 12/2013 | Kukulski |
| 2014/0007002 A1 | 1/2014 | Chang |
| 2014/0009401 A1 | 1/2014 | Bajaj |
| 2014/0022189 A1 | 1/2014 | Sheng |
| 2014/0032880 A1 | 1/2014 | Ka |
| 2014/0037951 A1 | 2/2014 | Kiyoe |
| 2014/0071069 A1* | 3/2014 | Anderson ........... A63F 13/2145 345/173 |
| 2014/0071095 A1 | 3/2014 | Godsill |
| 2014/0082545 A1 | 3/2014 | Zhai |
| 2014/0104191 A1 | 4/2014 | Davidson |
| 2014/0104192 A1 | 4/2014 | Davidson |
| 2014/0104274 A1 | 4/2014 | Hilliges |
| 2014/0109004 A1 | 4/2014 | Sadhvani |
| 2014/0168116 A1 | 6/2014 | Sasselli |
| 2014/0208275 A1 | 7/2014 | Mongia |
| 2014/0210788 A1 | 7/2014 | Harrison |
| 2014/0210791 A1 | 7/2014 | Hanauer |
| 2014/0240271 A1 | 8/2014 | Land |
| 2014/0240295 A1 | 8/2014 | Harrison |
| 2014/0247250 A1* | 9/2014 | Sheng .................. G06F 3/0436 345/177 |
| 2014/0253477 A1 | 9/2014 | Shim |
| 2014/0267065 A1 | 9/2014 | Levesque |
| 2014/0267085 A1 | 9/2014 | Li |
| 2014/0289659 A1 | 9/2014 | Harrison |
| 2014/0300559 A1 | 10/2014 | Tanimoto |
| 2014/0327626 A1 | 11/2014 | Harrison |
| 2014/0331313 A1 | 11/2014 | Kim |
| 2014/0368436 A1 | 12/2014 | Abzarian |

(56) References Cited

U.S. PATENT DOCUMENTS

| | | | |
|---|---|---|---|
| 2014/0368601 A1* | 12/2014 | deCharms | H04L 65/403 348/14.02 |
| 2015/0002405 A1 | 1/2015 | Kuan | |
| 2015/0035759 A1 | 2/2015 | Harrison | |
| 2015/0077378 A1 | 3/2015 | Duffield | |
| 2015/0145820 A1 | 5/2015 | Huang | |
| 2015/0242009 A1 | 8/2015 | Xiao | |
| 2015/0253858 A1 | 9/2015 | Koukoumidis | |
| 2015/0293592 A1 | 10/2015 | Cheong | |
| 2016/0012348 A1 | 1/2016 | Johnson | |
| 2016/0018942 A1 | 1/2016 | Kang | |
| 2016/0062545 A1 | 3/2016 | Lai | |
| 2016/0077615 A1 | 3/2016 | Schwarz | |
| 2016/0077650 A1 | 3/2016 | Durojaiye | |
| 2016/0077664 A1 | 3/2016 | Harrison | |
| 2016/0085324 A1 | 3/2016 | Schwarz | |
| 2016/0085333 A1 | 3/2016 | Harrison | |
| 2016/0085372 A1 | 3/2016 | Munemoto | |
| 2016/0098185 A1 | 4/2016 | Xiao | |
| 2016/0117015 A1 | 4/2016 | Veneri | |
| 2016/0156837 A1 | 6/2016 | Rodzevski | |
| 2016/0171192 A1 | 6/2016 | Holz | |
| 2016/0224145 A1 | 8/2016 | Harrison | |
| 2016/0231865 A1 | 8/2016 | Harrison | |
| 2016/0246396 A1* | 8/2016 | Dickinson | G06F 3/03545 |
| 2016/0299615 A1 | 10/2016 | Schwarz | |
| 2017/0024892 A1 | 1/2017 | Harrison | |
| 2017/0060279 A1 | 3/2017 | Harrison | |
| 2017/0153705 A1 | 6/2017 | Kim | |
| 2018/0329567 A1 | 11/2018 | Munemoto | |
| 2019/0050061 A1 | 2/2019 | Børstad | |
| 2019/0346969 A1 | 11/2019 | Yip | |
| 2019/0354210 A1* | 11/2019 | Akhbari | G06F 3/0436 |

FOREIGN PATENT DOCUMENTS

| | | |
|---|---|---|
| CN | 101111817 A | 1/2008 |
| CN | 101299174 A | 11/2008 |
| CN | 101339477 A | 1/2009 |
| CN | 101410781 A | 4/2009 |
| CN | 101424974 A | 5/2009 |
| CN | 101438218 A | 5/2009 |
| CN | 101763190 A | 6/2010 |
| CN | 101763193 A | 6/2010 |
| CN | 101921610 A | 12/2010 |
| CN | 101968696 A | 2/2011 |
| CN | 102153776 A | 8/2011 |
| CN | 102362249 A | 2/2012 |
| CN | 102789332 A | 11/2012 |
| CN | 103150019 A | 6/2013 |
| CN | 104020878 A | 9/2014 |
| EP | 0938039 A2 | 8/1999 |
| EP | 1659481 A2 | 5/2006 |
| EP | 1762926 A2 | 3/2007 |
| EP | 2136358 A1 | 12/2009 |
| EP | 2280337 A2 | 2/2011 |
| GB | 2344894 A | 6/2000 |
| GB | 2468742 A | 9/2010 |
| JP | H0969137 A | 3/1997 |
| JP | 2004213312 A | 7/2004 |
| JP | 2005018611 A | 1/2005 |
| JP | 2007524970 A | 8/2007 |
| JP | 2009543246 A | 12/2009 |
| JP | 2011028555 A | 2/2011 |
| JP | 2013519132 A | 5/2013 |
| JP | 2013532495 A | 8/2013 |
| KR | 20020075283 A | 10/2002 |
| KR | 20110061227 A | 6/2011 |
| KR | 20120100351 A | 9/2012 |
| WO | 9404992 A1 | 3/1994 |
| WO | 2008126347 A1 | 10/2008 |
| WO | 2009071919 A1 | 6/2009 |
| WO | 2011096694 A2 | 8/2011 |
| WO | 2012064034 A1 | 5/2012 |
| WO | 2012166277 A1 | 12/2012 |
| WO | 2013059488 A1 | 4/2013 |
| WO | 2013061998 A1 | 5/2013 |
| WO | 2014037951 A1 | 3/2014 |
| WO | 2014182435 A1 | 11/2014 |

OTHER PUBLICATIONS

"Swype Advanced Tips", [http://www.swype.com/tips/advanced-tips], Jun. 25, 2014, retrieved via the Wayback Machine on Jun. 29, 2018, [https:web.archive.Org/web/20140625073212/http://www.swype.com/tips/advanced-tips], 2 Pages.

"Swype Basics", [http://www.swype.com/tips/swype-basics], retrieved via the Wayback Machine dated Jun. 14, 2014, -retrieved via the Wayback Machine on Jun. 29, 2018, [https:web.archive.org/web/20140614200707/http://www.swype. mm/tips/swype-basics, 2 pages.

"Swype Tips", [http://www.swype.com/category/tips], Jul. 2, 2014, retrieved via the Wayback Machine on Jun. 29, 2018, [https:web.archive.Org/web/20140702102357/http://www.swype.com/category/tips, 2 pages.

"Mimio", http://www.mimio.com, retrieved Jul. 8, 2019, 8 pages.

Asano et al., "Real-Time Sound Source Localization and Separation System and Its Application to Automatic Speech Recognition", Proceedings of Eurospeech, 2001; p. 1013-1016; 2001.

Benko et al. "Sphere: Multi-Touch Interactions on a Spherical Display", Proceedings of UIST, 2008; pp. 77-86.

Burges, Christopher, "A Tutorial on Support Vector Machines for Pattern Recognition," Data Mining and Knowledge Discovery, vol. 2, Issue 2, pp. 121-167, Jun. 1998.

Cao et al., "ShapeTouch: Leveraging Contact Shape on Interactive Surfaces", IEEE International Workshop on Horizontal Interactive Human Computer System (TABLETOP), 2008, pp. 139-146.

Cheng, B. et al., "SilentSense: Silent User Identification via Dynamics of Touch and Movement Behavioral Biometrics," Cryptography and Security (cs CR); Human-Computer Interaction, pp. 9, Aug. 31, 2013, 9 pages.

Chinese First Office Action received for Chinese Patent Application No. 201510240372.6 dated Sep. 27, 2018, 18 pages (including English Translation).

Chinese First Office Action received for Chinese Patent Application Serial No. 201580051873.8 dated Jun. 21, 2019, 15 pages (Including English Translation).

Chinese Office Action dated Apr. 15, 2016 for Chinese Application No. 201280062500.7, 18 pages.

Chinese Office Action dated Apr. 21, 2017 for Chinese Patent Application No. 201480022056.5, 23 pages. (with Translation).

Chinese Office Action dated Feb. 9, 2018 for Chinese Patent Application No. 201480022056.5, 19 pages. (with Translation).

Chinese Office Action for Chinese Patent Application No. 201280062500.7 dated Apr. 17, 2017, 15 pages (including English Translation).

Chinese Office Action for Chinese Patent Application No. 201280062500.7 dated Nov. 7, 2016, 9 pages.

Chinese Office Action for Chinese Patent Application No. 201280062500.7, dated Apr. 27, 2018, 19 pages (with English Translation).

Chinese Office Action for Chinese Patent Application No. 201280062500.7, dated Oct. 10, 2018, 14 pages.

Chinese Office Action for Chinese Patent Application No. 201510240522.3 dated Jun. 28, 2018, 30 pages (including English Translation).

Chinese Search Report dated Mar. 29, 2016 for Chinese Application No. 201280062500.7, 1 page.

Chinese Search Report received for Chinese Patent Application No. 201580053216.7, dated Apr. 16, 2019, 2 Pages.

Chinese Second Office Action received for Chinese Patent Application No. 201510240372.6 dated May 15, 2019, 16 Pages (including English Translation).

Chinese Second Office Action received for Chinese Patent Application No. 201580000833.0 dated Jan. 15, 2018, 17 pages.

Communication pursuant to Article 94(3) EPC for EP Application No. 12842495.9 dated Jun. 18, 2018, 4 pages.

(56) References Cited

OTHER PUBLICATIONS

Communication pursuant to Article 94(3) EPC for European Patent Application No. 14785422.8 dated Nov. 22, 2018, 5 pages.
Communication pursuant to Article 94(3) EPC for European Patent Application No. 15840819.5 dated Jan. 23, 2019, 6 pages.
Communication pursuant to Article 94(3) EPC for European Patent Application No. 15842839.1 dated Apr. 9, 2019, 7 pages.
Communication pursuant to Article 94(3) EPC for European Patent Application No. 15843933.1 dated Jan. 23, 2019, 6 pages.
Communication pursuant to Article 94(3) EPC for European Patent Application No. 15845310.0 dated Jan. 3, 2019, 4 pages.
Communication pursuant to Article 94(3) EPC dated Feb. 26, 2018 in European Patent Application No. 14785422.8, 7 pages.
Communication pursuant to Article 94(3) EPC dated Mar. 5, 2018 in European Patent Application No. 14794212.2, 5 pages.
Communication pursuant to Article 94(3) EPC received for European Patent Application No. 14832247.2 dated May 3, 2019, 7 pages.
Communication pursuant to Rules 70(2) and 70a(2) EPC received for European Patent Application No. 16818725.0 dated Jan. 8, 2019, 1 page.
Communication pursuant to Rules 70(2) and 70a(2) EPC received for European Patent Application No. 16839786.7 dated Mar. 1, 2019, 1 page.
Deyle et al., "Hambone: A Bio-Acoustic Gesture Interface", Proceedings of ISWC, 2007, pp. 1-8.
Dietz et al., "DiamondTouch: A Multi-User Touch Technology" ACM Symposium on User Interface Software & Technology (UIST), 2001, pp. 219-226.
Dietz et al., DT Controls: Adding Identity to Physical Interfaces, ACM Symposium on User Interface Software & Technology (UIST), 2005, pp. 245-252.
English Translation of Chinese Office Action dated Nov. 3, 2017 in Chinese Application No. 201480002856.0, 12 pages.
English Translation of Final Rejection dated Apr. 27, 2015 in Korean Patent Application No. 10-2014-0027979, 3 pages.
English Translation of Final Rejection dated Dec. 12, 2014 in Korean Patent Application No. 10-2014-0027979, 3 pages.
English Translation of First Office Action dated Feb. 27, 2017 in Chinese Application No. 201480002879.1, 13 pages.
English Translation of First Office Action dated May 2, 2017 in Chinese Patent Application No. 201580000833.0, 9 pages.
English Translation of First Office Action dated Oct. 11, 2017 in Chinese Patent Application No. 20150209998.0, 10 pages.
English Translation of Notification of Reason For Refusal dated Jul. 10, 2014 in Korean patent application No. 10-2014-0027979, 3 pages.
English Translation of Second Office Action dated Jul. 6, 2017 in Chinese Application No. 201480002879.1, 14 pages.
English Translation of Third Office Action dated Oct. 16, 2017 in Chinese Application No. 201480002879.1, 4 pages.
European Patent Office Extended Search Report for EP 14 79 4212; dated Nov. 9, 2016, 8 pages.
European Patent Office Extended Search Report for EP 14 83 2247; dated Feb. 23, 2017, 11 pages.
European Search Report dated Apr. 8, 2019 for European Application No. 18195588.1, 7 pages.
European Search Report received for European Patent Application No. 16818725.0, dated Dec. 21, 2018, 8 Pages.
European Search Report received for European Patent Application No. 16839786.7, dated Feb. 12, 2019, 8 Pages.
European Search Report received for European Patent Application Serial No. 12842495.9, dated Jul. 24, 2015, 7 Pages.
Extended European Search Report dated Apr. 16, 2018 in European Application No. 15845310.0, 7 pages.
Extended European Search Report dated Aug. 11, 2016 in European Patent Application No. 14785422.8, 8 Pages.
Extended European Search Report dated Aug. 25, 2017 in European Patent Application No. 157 48667.1, 10 pages.
Extended European Search Report dated Jul. 22, 2014 in European Patent Application No. 12755563.9, 5 Pages.
Extended European Search Report dated Mar. 16, 2018 in European Patent Application No. 15842839.1, 7 Pages.
Extended European Search Report dated Mar. 19, 2018 in European Patent Application No. 15840819.5, 9 Pages.
Extended European Search Report dated Mar. 19, 2018 in European Patent Application No. 15843933.1, 8 Pages.
Extended European Search Report dated Mar. 27, 2018 in European Patent Application No. 15843989.3, 8 Pages.
Extended European Search Report dated May 14, 2018 in European Patent Application No. 15847469.2, 11 pages.
Final Office Action issued for U.S. Appl. No. 15/206,554 dated Feb. 1, 2017, 20 pages.
Final Office Action dated Aug. 8, 2018 in U.S. Appl. No. 14/834,434, 19 pages.
Final Office Action dated Feb. 9, 2016 in U.S. Appl. No. 14/486,800, 14 pages.
Final Office Action dated Feb. 26, 2016 in U.S. Appl. No. 14/492,604, 16 pages.
Final Office Action dated Jan. 5, 2018 in U.S. Appl. No. 14/503,894, 16 pages.
Final Office Action dated Jan. 9, 2018 in U.S. Appl. No. 13/863,193, 50 pages.
Final Office Action dated Jul. 12, 2017 in U.S. Appl. No. 14/495,041, 14 pages.
Final Office Action dated Jul. 18, 2017 in U.S. Appl. No. 14/191,329, 17 pages.
Final Office Action dated Jun. 8, 2016 in U.S. Appl. No. 14/495,041, 16 pages.
Final Office Action dated Jun. 30, 2017 in U.S. Appl. No. 13/958,427, 15 pages.
Final Office Action dated Mar. 4, 2015 in U.S. Appl. No. 13/863,193, 50 pages.
Final Office Action dated Mar. 7, 2018 in U.S. Appl. No. 14/219,919, 21 pages.
Final Office Action dated Mar. 28, 2016 in U.S. Appl. No. 13/958,427, 16 pages.
Final Office Action dated May 6, 2016 in U.S. Appl. No. 14/191,329, 17 pages.
Final Office Action dated May 13, 2016 in U.S. Appl. No. 14/390,831, 6 pages.
Final Office Action dated May 20, 2016 in U.S. Appl. No. 14/503,894, 17 pages.
Final Office Action dated Nov. 9, 2016 in U.S. Appl. No. 14/612,089, 11 pages.
Final Office Action dated Nov. 23, 2015 in U.S. Appl. No. 14/668,870, 14 pages.
Final Office Action dated Nov. 28, 2014 in U.S. Appl. No. 13/849,698, 21 pages.
Final Office Action dated Feb. 24, 2016 U.S. Appl. No. 13/887,711, 23 pages.
Final Office Action dated Sep. 6, 2017 in U.S. Appl. No. 14/486,800, 17 pages.
Final Office Action dated Sep. 15, 2016 in U.S. Appl. No. 13/863,193, 50 pages.
Final Office Action received for U S U.S. Appl. No. 14/191,329, dated Aug. 7, 2015, 29 pages.
Final Office Action received for U.S. Appl. No. 13/887,711, dated Jun. 8, 2017, 33 pages.
Final Office Action received for U.S. Appl. No. 13/958,427, dated Jun. 19, 2015, 17 pages.
Final Office Action received for U.S. Appl. No. 14/492,604, dated Mar. 17, 2017, 37 pages.
Final Office Action received for U.S. Appl. No. 13/887,711 dated Jul. 25, 2019, 24 pages.
Final Office Action received for U.S. Appl. No. 14/242,127 dated Mar. 31, 2016, 34 pages.
Final Office Action received for U.S. Appl. No. 14/242,127 dated Sep. 18, 2015, 28 pages.
Final Office Action received for U.S. Appl. No. 14/495,041 dated Aug. 9, 2019, 26 pages.

(56) References Cited

OTHER PUBLICATIONS

Final Office Action received for U.S. Appl. No. 14/684,407 dated Sep. 20, 2019, 26 pages.
Final Office Action received for U.S. Appl. No. 15/075,648 dated Dec. 21, 2018, 13 pages.
Final Office Action received for U.S. Appl. No. 15/075,648 dated May 31, 2019, 17 pages.
Final Office Action received for U.S. Appl. No. 15/198,062 dated Sep. 6, 2018, 32 pages.
Final Office Action received for U.S. Appl. No. 16/126,175 dated Aug. 2, 2019, 161 pages.
Final Office Action received for U.S. Appl. No. 14/219,919, dated Aug. 26, 2016, 24 pages.
Final Office Action received for U.S. Appl. No. 14/834,434, dated May 1, 2017, 18 pages.
Final Office Action received for U.S. Appl. No. 15/073,407, dated Dec. 20, 2016, 49 pages.
Final Office Action received for U.S. Appl. No. 14/684,407 dated Jan. 18, 2017, 20 pages.
Final Office Action received for U.S. Appl. No. 14/684,407 dated Mar. 12, 2018, 14 pages.
Final Office Action received for U.S. Appl. No. 14/684,407 dated Jun. 10, 2019, 26 pages.
First Examination report received for Australian Patent Application No. 2012225130, dated Feb. 9, 2015, 4 pages.
First Office Action received for Canadian Patent Application No. 2802746, dated Apr. 9, 2013, 3 pages.
First Office Action received for Canadian Patent Application No. 2869699, dated Nov. 27, 2014, 3 pages.
Gutwin et al., "Supporting Informal Collaboration in Shared-Workspace Groupware", Journal of Universal Computer Science, vol. 14, No. 9, 2008, pp. 1411-1434.
Hall et al., "The WEKA Data Mining Software: An Update", SIGKDD Explorations, vol. 11, No. 1, 2009, pp. 10-18.
Harrison et al., "Scratch Input: Creating Large, Inexpensive, Unpowered and Mobile Finger Input Surfaces", Proceedings of UIST, 2008, pp. 205-208.
Harrison et al., Skinput: Appropriating the Body as an Input Surface, Proceedings of CHI, Apr. 10-15, 2010, pp. 453-462.
Hartmann et al., "Augmenting Interactive Tables with Mice & Keyboards", Proceedings of UIST, 2009, pp. 149-152.
Hinckley et al., "Manual Deskterity: An Exploration of Simultaneous Pen+ Touch Direct Input", Proceedings of CHI, 2010, pp. 2793-2802.
Hinckley et al., "Pen+ Touch= New Tools", Proceedings of UIST, 2010, pp. 27-36.
Hinckley et al., "Sensor Synaesthesia: Touch in Motion, and Motion in Touch", Proceedings of CHI, 2011, pp. 801-810.
Holz et al., "The Generalized Perceived Input Point Model and How to Double Touch Accuracy by Extracting Fingerprints" Proceedings of CHI, 2010, pp. 581-590.
International Search Report and Written Opinion for PCT/US2015/014581; dated May 14, 2015, 7 pages.
International Search Report and Written Opinion for PCT/US2015/047428; dated Nov. 27, 2015, 6 pages.
International Search Report and Written Opinion for PCT/US2015/047616; dated Jul. 1, 2016, 7 pages.
International Search Report and Written Opinion for PCT/US2015/050570; dated Dec. 17, 2015, 8 pages.
International Search Report and Written Opinion for PCT/US2015/051106; dated Jan. 28, 2016, 9 pages.
International Search Report and Written Opinion for PCT/US2015/051355; dated Dec. 15, 2015, 9 pages.
International Search Report and Written Opinion for PCT/US2015/051582; dated Feb. 26, 2016, 12 pages.
International Search Report and Written Opinion for PCT/US2016/040194; dated Sep. 19, 2016, 7 pages.
International Search Report and Written Opinion for PCT/US2016/044552; dated Oct. 17, 2016, 14 pages.
International Search Report and Written Opinion dated Jul. 8, 2013 in International Application No. PCT/CA2013/000292, 9 pages.
International Search Report and Written Opinion dated Jun. 6, 2012 in International Patent Application No. PCT/CA2012/050127, 10 pages.
International Search Report and Written Opinion received for International Patent Application No. PCT/US2012/060865 dated Mar. 29, 2013, 10 pages.
International Search Report and Written Opinion received for PCT Application No. PCT/US2014/033380 dated Mar. 13, 2015, 7 pages.
International Search Report and Written Opinion received for PCT Application No. PCT/US2014/034977 dated Sep. 18, 2014, 8 pages.
International Search Report and Written Opinion received for PCT Application No. PCT/US2014/049485 dated Nov. 17, 2014, 13 pages.
Japanese Office Action dated Aug. 1, 2018 for Japanese Patent Application No. 2017-049566, 9 pages (including English translation).
Japanese Office Action for Japanese Patent Application No. 2014-537253 dated May 16, 2017, 5 pages (including English Translation).
Japanese Office Action for Japanese Patent Application No. 2014-537253 dated Apr. 26, 2016, 3 pages.
Japanese Office Action for Japanese Patent Application No. 2014-537253 dated Nov. 15, 2016, 3 pages.
Japanese Office Action for Japanese Patent Application No. 2017-049566 dated Jun. 5, 2018, 7 pages (including English Translation).
Kaltenbrunner, M. et al., "reacTIVision: A Computer-Vision Framework for Table-Based Tangible Interaction," Proceedings of TEI, 2007, pp. 69-74.
Kashino, K., "Audio fingerprinting: Techniques and applications", Acoustical Science and Technology, The Acoustical Society of Japan, Feb. 1, 2010, vol. 66, No. 2, p. 71-76. Retrieved on May 29, 2017, 6 pages.
Kherallah, M et al., "On-line handwritten digit recognition based on trajectory and velocity modeling," Pattern Recognition Letters, vol. 29, Issue 5, pp. 580-594, Apr. 1, 2008.
Korean Office Action dated Jan. 10, 2019 for Korean Patent Application No. 2014-7010323, 11 pages (including English translation).
Matsushita et al., "HoloWall: Designing a Finger, Hand, Body, and Object Sensitive Wall", Proceedings of UIST, 1997, pp. 209-210.
Non-Final Office Action dated Apr. 19, 2017 in U.S. Appl. No. 14/869,998, 7 pages.
Non-Final Office Action dated Apr. 6, 2017 in U.S. Appl. No. 13/863,193, 70 pages.
Non-Final Office Action dated Apr. 15, 2015 in U.S. Appl. No. 13/856,414, 17 pages.
Non-Final Office Action dated Apr. 16, 2018 in U.S. Appl. No. 13/958,427, 14 pages.
Non-Final Office Action dated Apr. 26, 2018 in U.S. Appl. No. 14/495,041, 15 pages.
Non-Final Office Action dated Dec. 20, 2017 in U.S. Appl. No. 14/834,434, 12 pages.
Non-Final Office Action dated Jan. 7, 2016 in U.S. Appl. No. 13/863,193, 58 pages.
Non-Final Office Action dated Jul. 8, 2015 in U.S. Appl. No. 14/191,329, 18 pages.
Non-Final Office Action dated Jul. 11, 2017 in U.S. Appl. No. 14/390,831, 79 pages.
Non-Final Office Action dated Jul. 17, 2017 in U.S. Appl. No. 15/073,407, 8 pages.
Non-Final Office Action dated Jul. 19, 2017 in U.S. Appl. No. 14/219,919, 20 pages.
Non-Final Office Action dated Jul. 30, 2018 in U.S. Appl. No. 15/406,770, 20 pages.
Non-Final Office Action dated Jun. 9, 2016 in U.S. Appl. No. 14/612,089, 11 pages.
Non-Final Office Action dated Jun. 13, 2016 in U.S. Appl. No. 15/073,407, 49 pages.
Non-Final Office Action dated Jun. 24, 2014 in U.S. Appl. No. 13/849,698, 21 pages.

(56) References Cited

OTHER PUBLICATIONS

Non-Final Office Action dated Jun. 26, 2018 in U.S. Appl. No. 14/486,800, 25 pages.
Non-Final Office Action dated May 7, 2018 in U.S. Appl. No. 14/191,329, 17 pages.
Non-Final Office Action dated May 9, 2018 in U.S. Appl. No. 13/887,711, 27 pages.
Non-Final Office Action dated Nov. 15, 2017 in U.S. Appl. No. 15/198,062, 24 pages.
Non-Final Office Action dated Nov. 24, 2015 in U.S. Appl. No. 14/191,329, 31 pages.
Non-Final Office Action dated Oct. 8, 2015 in U.S. Appl. No. 13/958,427, 15 pages.
Non-Final Office Action dated Oct. 16, 2014 in U.S. Appl. No. 13/780,494, 10 pages.
Non-Final Office Action dated Oct. 18, 2017 in U.S. Appl. No. 15/406,770, 12 pages.
Non-Final Office Action dated Oct. 19, 2015 in U.S. Appl. No. 14/668,870, 6 pages.
Non-Final Office Action dated Oct. 23, 2014 in U.S. Appl. No. 14/275,124, 10 pages.
Non-Final Office Action dated Oct. 25, 2013 in U.S. Appl. No. 13/410,956, 8 pages.
Non-Final Office Action dated Oct. 28, 2015 in U.S. Appl. No. 14/390,831, 22 pages.
Non-Final Office Action dated Sep. 2, 2014 in U.S. Appl. No. 13/863,193, 41 pages.
Non-Final Office Action dated Sep. 8, 2016 in U.S. Appl. No. 14/492,604, 14 pages.
Non-Final Office Action dated Sep. 9, 2016 in U.S. Appl. No. 13/887,711, 24 pages.
Non-Final Office Action dated Sep. 29, 2016 in U.S. Appl. No. 14/834,434, 12 pages.
Non-Final Office Action received for U.S. Appl. No. 14/503,894, dated Dec. 30, 2015, 18 pages.
Non-Final Office Action received for U.S. Appl. No. 13/887,711, dated Apr. 6, 2015, 36 pages.
Non-Final Office Action received for U.S. Appl. No. 14/483,150 dated Dec. 18, 2015, 7 pages.
Non-Final Office Action received for U.S. Appl. No. 14/495,041, dated Nov. 25, 2016, 35 pages.
Non-Final Office Action received for U.S. Appl. No. 14/503,894, dated May 16, 2017, 33 pages.
Non-Final Office Action received for U.S. Appl. No. 14/612,089 dated May 31, 2017, 21 pages.
Non-Final Office Action received for U.S. Appl. No. 14/684,407 dated Aug. 2, 2017, 14 pages.
Non-Final Office Action received for U.S. Appl. No. 15/075,648, dated Apr. 21, 2017, 8 pages.
Non-Final Office Action received for U.S. Appl. No. 14/191,329 dated Jul. 16, 2019, 30 pages.
Non-Final Office Action received for U.S. Appl. No. 14/242,127 dated Dec. 28, 2015, 38 pages.
Non-Final Office Action received for U.S. Appl. No. 14/242,127 dated Jun. 2, 2015, 33 pages.
Non-Final Office Action received for U.S. Appl. No. 14/834,434 dated Aug. 5, 2019, 19 pages.
Non-Final Office Action received for U.S. Appl. No. 15/206,554 dated Sep. 21, 2016, 36 pages.
Non-Final Office Action received for U.S. Appl. No. 15/815,679 dated Sep. 28, 2018, 69 pages.
Non-Final Office Action received for U.S. Appl. No. 15/836,798 dated Jul. 5, 2019, 95 pages.
Non-Final Office Action received for U.S. Appl. No. 16/126,175 dated Nov. 1, 2018, 86 pages.
Non-Final Office Action received for U.S. Appl. No. 13/958,427, dated Mar. 13, 2015, 50 pages.
Non-Final Office Action received for U.S. Appl. No. 14/492,604, dated Oct. 1, 2015,16 pages.
Non-Final Office Action received for U.S. Appl. No. 13/958,427, dated Nov. 10, 2016, 22 pages.
Non-Final Office Action received for U.S. Appl. No. 14/191,329, dated on Feb. 2, 2017, 20 pages.
Non-Final Office Action received for U.S. Appl. No. 14/486,800, dated Dec. 1, 2016, 29 pages.
Non-Final Office Action received for U.S. Appl. No. 14/684,407, dated Sep. 14, 2018, 24 pages.
Non-Final Office Action received for U.S. Appl. No. 14/751,589, dated Jun. 13, 2016, 20 pages.
Non-Final Office Action received for U.S. Appl. No. 14/684,407 dated Jul. 8, 2016,19 pages.
Non-Final Office Action received dated Nov. 5, 2015 U.S. Appl. No. 13/887,711, 19 pages.
Non-Final Office Action—dated Oct. 2, 2015 U.S. Appl. No. 14/486,800, filed Sep. 15, 2014, 21 pages.
Non-Final Office Action—dated Oct. 7, 2015 U.S. Appl. No. 14/495,041, 14 pages.
Non-Final Office Action—dated Jan. 29, 2016 U.S. Appl. No. 14/219,919, 11 pages.
Notice of Allowance dated Dec. 6, 2016 in U.S. Appl. No. 14/751,589, 27 pages.
Notice of Allowance dated Feb. 2, 2015 in U.S. Appl. No. 13/780,494, 43 pages.
Notice of Allowance dated Jan. 26, 2015 in U.S. Appl. No. 13/849,698, 27 pages.
Notice of Allowance dated May 22, 2018 in U.S. Appl. No. 13/863,193, 73 pages.
Notice of Allowance dated Sep. 1, 2016 in U.S. Appl. No. 13/856,414, 28 pages.
Notice of Allowance received for U.S. Appl. No. 14/242,127 dated Apr. 13, 2016, 18 pages.
Notice of Allowance received for U.S. Appl. No. 14/242,127 dated Sep. 2, 2016, 16 pages.
Office Action dated Aug. 10, 2018 for U.S. Appl. No. 15/886,562, 86 pages.
Office Action dated Jan. 28, 2019 for U.S. Appl. No. 15/836,798, 30 pages.
Office Action dated Mar. 30, 2018 for U.S. Appl. No. 15/886,562, 44 pages.
Olwal et al., "SurfaceFusion: Unobtrusive Tracking of Everyday Objects in Tangible User Interfaces", Proceedings of GI, 2008, pp. 235-242.
Paradiso et al., "Tracking and Characterizing Knocks Atop Large Interactive Displays", Sensor Review, vol. 25, No. 2, 2005, pp. 134-143.
Paradiso, J. et al., "Sensor Systems for Interactive Surfaces," IBM Systems Journal, vol. 39, Issue 3-4, pp. 892-914, 2000.
Patten, James, Mcmichael., "Sensetable: A Wireless Object Tracking Platform for Tangible User Interfaces", Proceedings of CHI, 2001, pp. 253-260.
Pedro, L et al., "Augmenting touch interaction through acoustic sensing", Proceedings of the ACM International 3onference on Interactive Tabletops and Surfaces, pp. 53-56, Nov. 13- 16, 2011.
Rekimoto et al., "Augmented Surfaces: A Spatially Continuous Work Space for Hybrid Computing Environments", Proceedings of CHI, 1999, pp. 378-385.
Rekimoto et al., "SmartSkin: An Infrastructure for Freehand Manipulation on Interactive Surfaces", Proceedings of CHI, 2002, pp. 113-120.
Rekimoto et al., "ToolStone: Effective use of the Physical Manipulation Vocabularies of Input Devices", Proceedings of UIST, 2000, pp. 109-117.
S. Furui, "Digital Speech Processing, synthesis, and recognition" Marcel Dekker, Inc. 2001. 40 pages.
Sarah, M. K. et al., "A Personal Touch—Recognizing Users Based on Touch Screen Behavior," PhoneSense'12, Nov. 6, 2012, Toronto, ON, Canada, Nov. 6, 2012, 5 pages.
Schwarz, J. et al., "Probabilistic Palm Rejection Using Spatiotemporal Touch Features and Iterative Classification," Proceedings of the SIGCHI Conference on Human Factors in Computing Systems, pp. 2009-2012, Apr. 26-May 1, 2014.

(56) References Cited

OTHER PUBLICATIONS

Search Report dated Apr. 21, 2017 in Chinese Patent Application No. 201580000833.0, 1 page.
Second Office Action received for Canadian Patent Application No. 2869699, dated Jun. 14, 2016, 4 pages.
Seo et al.., "Audio Fingerprinting Based on Normalized Spectral Subband Centroids," Proc. ICASSP, {U.S.A.), 2005, vol. 3, p. 213-216. Retrieved on May 29, 2017, 4 pages.
Third Chinese Office Action received for Chinese Patent Application No. 201480022056.5 dated Jul. 19, 2018, 6 pages (with English translation).
Third Office Action received for Canadian Patent Application No. 2869699, dated Jan. 9, 2017, 3 pages.
U.S. Appl. No. 14/191,329, filed Feb. 26, 2014, titled "Using Capacitive Images for Touch Type Classification", 42 pages.
U.S. Appl. No. 13/780,494, filed Feb. 28, 2013, titled: "Input Tools Having Viobro-Acoustically Distinct Regions and Computing Device for Use With the Same.", 34 pages.
U.S. Appl. No. 13/849,698, filed Mar. 25, 2013, titled: "Method and System for Activating Different Interactive Functions Using Different Types of Finger Contacts.", 52 pages.
U.S. Appl. No. 13/887,711, filed May 6, 2013, titled: "Using Finger Touch Types to Interact with Electronic Devices.",42 pages.
U.S. Appl. No. 13/958,427, filed Aug. 2, 2013, titled: "Capture of Vibro-Acoustic Data Used to Determine Touch Types.",45 pages.
U.S. Appl. No. 14/242,127, filed Apr. 1, 2014, titled: "Method and Apparatus for Classifying Touch Events On a Touch Sensitive Surface.", 36 pages.
U.S. Appl. No. 14/483,150, filed Sep. 11, 2014, titled: "Method and Apparatus for Differentiating Touch Screen Users Based On Touch Event Analysis.", 38 pages.
U.S. Appl. No. 14/492,604, filed Sep. 22, 2014, titled: "Method and Apparatus for Improving Accuracy of Touch Screen Event Analysis By Use of Edge Classification.", 35 pages.
U.S. Appl. No. 14/495,041, filed Sep. 24, 2014, titled: "Method for Improving Accuracy of Touch Screen Event Analysis By Use of Spatiotemporal Touch Patterns.", 34 pages.
Vandoren et al., "DIP-IT: Digital Infrared Painting on an Interactive Table", Proceedings of CHI, 2008, pp. 2901-2906.
Wang et al., "Empirical Evaluation for Finger Input Properties in Multi-Touch Interaction", Proceedings of CHI, 2009, pp. 1063-1072.
Weidong, S. et al., "SenGuard: Passive user identification on smartphones using multiple sensors," IEEE 7th International Conference on Wireless and Mobile Computing, Networking and Communications (WiMob), pp. 141-148, 2011.
International Search Report and Written Opinion for App. No. PCT/US21/15292, dated Apr. 7, 2021, 17 pages.
Office Action dated Mar. 25, 2021 for U.S. Appl. No. 16/457,293 (pp. 1-27).
International Search Report and Written Opinion for App. No. PCT/US2020/039922, dated Sep. 11, 2020, 18 pages.
Office Action (Non-Final Rejection) dated Aug. 3, 2022 for U.S. Appl. No. 17/547,209 (pp. 1-28).
Office Action (Notice of Allowance and Fees Due (PTOL-85)) dated Aug. 31, 2022 for U.S. Appl. No. 17/547,209 (pp. 1-8).
Office Action (Notice of Allowance and Fees Due (PTOL-85)) dated Sep. 13, 2021 for U.S. Appl. No. 16/457,293 (pp. 1-8).

\* cited by examiner

ADAPTIVE ULTRASONIC SENSING TECHNIQUES AND SYSTEMS TO MITIGATE INTERFERENCE

TECHNICAL FIELD OF THE INVENTION

The invention generally relates to sensing technology for detecting and analyzing objects in the environment, such as stylus objects in relation to a touch sensitive screen on a mobile device, and more specifically, it relates to ultrasonic sensing.

BACKGROUND

One type of object sensing technology is an ultrasonic sensing system. An ultrasonic sensing system may be implemented on an electronic device that can be operated to detect objects, including a user's finger, stylus, or other environmental objects, in an environment. This feature is particularly a characteristic of the recent generation of smart phones. Typically, touch display screens can respond to finger contact to activate the touch display screen for further processes. Contact also can be made with the touch display screen using tools such as a stylus, other parts of the hand of the user, such as the palm and various parts of the finger, or the ear or face of the user. In one useful application, the ultrasonic sensing system can be used to enhance detection and classification of objects proximate to the touch screen.

The above-described description is merely intended to provide a contextual overview relating to ultrasonic sensing devices used in a system with other sensing devices, and is not intended to be exhaustive.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one embodiment, a method of enhancing operation of an ultrasonic sensing device for determining the status of an object near such ultrasonic sensing device is disclosed. From the ultrasonic sensing device, an emission signal having a current frequency or band in an ultrasonic frequency range is emitted. Ultrasonic signals are received and analyzed to detect one or more objects near or contacting the ultrasonic sensing device. After expiration of a predefined time period of emitting the emission signal, a background noise signal is detected from an environment of the ultrasonic device and background noise metrics are estimated based on the background noise signal. It is then determined whether the current frequency of the emission signal is optimized based on the background noise metrics. A next frequency or band is selected and the emission signal is emitted at the next frequency or band if it is determined that the current frequency or band is not optimum. The operations of detecting, estimating, determining, and selecting are repeated after each time a next frequency or band is selected and the emission signal is emitted at such next frequency or band.

In a specific implementation, the operation of emitting the emission signal is halted after expiration of the predefined time period. In a further aspect, the predefined time period includes a time period corresponding to how long it takes for the emission signal to be eliminated from the environment after halting emission so that the emission signal does not affect the operation for estimating the background noise. In another aspect, estimating the background noise includes representing the background noise signal in the frequency domain to obtain frequency components of the background noise signal. In this example, emission of the emission signal is restarted and one or more frequency components are subtracted from ultrasonic signals that are received prior to analyzing such ultrasonic signals to detect one or more objects near or contacting the ultrasonic sensing device.

In another embodiment, the predefined time period corresponds to an average or mean time period between changes in the background noise's frequency profile. In a further aspect, the changes in the background noise's frequency profile correspond to scheduled operation and shutdown time periods for nearby machinery. In another example, one or more environment parameters are periodically measured and the predefined time period is dynamically adjusted so that it expires when one or more measured environment parameters have a value that will likely significantly affect a frequency response of the background noise or emission signal.

In an alternative embodiment, at least one operation of estimating, determining, or selecting is based on parameter input, including one or more frequency response curves for one or more types of measured parameters. In another aspect, the ultrasonic sensing device is part of a system having a touch sensitive surface. In this aspect, a reflected ultrasonic signal comprising at least a second frequency is detected by the ultrasonic sensing device. The reflected ultrasonic signal is reflected off of an object in proximity to the touch sensitive screen to produce the reflected ultrasonic signal. The ultrasonic sensing device determines a movement status of the object in relation to the touch sensitive screen, based at least in part on a frequency shift between the current frequency of the emission signal and the second frequency of the reflected ultrasonic signal, to facilitate classifying an interaction of the object with the touch sensitive screen. In a further aspect, sensor data is received, by the system, from at least two of a touch sensor associated with the touch sensitive screen, an ultrasonic sensor associated with the ultrasonic sensor device, an audio sensor, an accelerometer, a gyroscope, or an inertial measurement unit. In one aspect, the sensor data comprises the reflected ultrasonic signal received from the ultrasonic sensor and at least one of an audio signal received from the audio sensor, touch surface data received from the touch sensor, accelerometer data received from the accelerometer, gyroscope data received from the gyroscope, or inertial measurement data received from the inertial measurement unit. The sensor data is analyzed and the interaction of the object with the touch sensitive screen is classified based at least in part on a result of the analyzing of the sensor data. The result comprises information relating to the frequency shift between the current frequency of the ultrasonic emission signal and the second frequency of the reflected ultrasonic signal that indicates the movement status of the object in relation to the touch sensitive screen.

In an alternative embodiment, the invention pertains to an ultrasonic sensing system having at least one speaker configured to emit an emission signal having a current frequency or band in an ultrasonic frequency range and at least one audio sensor configured to sense ultrasonic signals for detecting one or more objects near or contacting the ultrasonic sensing device. This system includes at least one processor and memory that are operable for performing any combination of the above-described operations.

These and other aspects of the invention are described further below with reference to the figures.

DETAILED DESCRIPTION OF EXAMPLE EMBODIMENTS

In the following description, numerous specific details are set forth in order to provide a thorough understanding of the present invention. The present invention may be practiced without some of these specific details. In other instances, well known process operations have not been described in detail to not unnecessarily obscure the present invention. While the invention will be described in conjunction with the specific embodiments, it will be understood that it is not intended to limit the invention to the embodiments.

In general, an ultrasonic sensing system emits ultrasound waves into the surrounding environment, and the emitted ultrasound waves are then reflected off one or more objects in the surrounding environment to then return to a sensor that records the resulting ultrasound waves. The recorded ultrasound may then be processed and analyzed to infer object information about the one or more objects in the surrounding environment. As an example, such object information can include an estimated distance of a single nearby object and such object's velocity relative to the ultrasonic system. Other object information may include attributes of the environment itself, such as size of an enclosure in which the system is contained. This object information may also be used to infer the intensions of a user who interacts with the system, which is or contains the ultrasonic sensing system. An ultrasonic system may be configured to provide object information to other nearby devices or systems that also may interact with such objects and/or the ultrasonic system.

Figure 1A:
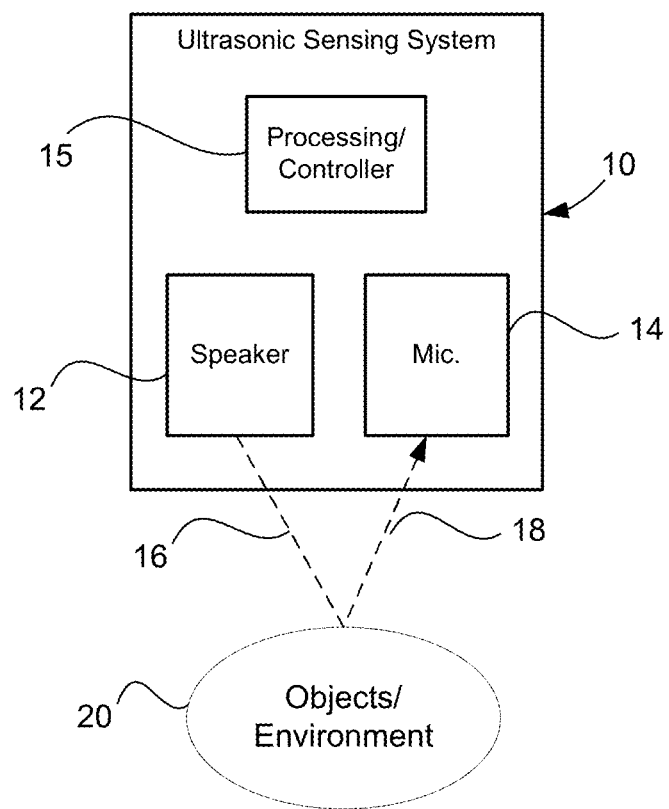
FIG. 1A is a diagrammatic representation of ultrasonic sensing system.

FIG. 1A is a diagrammatic representation of ultrasonic sensing system 10. As shown, the system 10 may include one or more transmitters, such as speaker 12, and one or more receivers, such as microphone 14. The system may also include a processing and/or controller system 15, such as a central processing unit and a memory system. When ultrasonic waves (signals) 16 are emitted from the transmitter 12, the waves may reflect from surfaces of objects 20 in the environment and return to the system in the form of reflected waves 18 to be recorded in a memory system. The processor 15 may be configured to analyze data based on the reflected waves to determine the status of environment objects 20. The processor/controller 15 may also be configured to control various components of the ultrasonic system. As described further below, the ultrasonic sensing system 10 may be integrated in any suitable type of electronic device, such a mobile device, having other sensing technologies, such a touch screen sensing.

Multiple sounds can be detected and recorded by the ultrasonic sensing system 10. Ideally, a strong audio signal that is reflected from an object and detected will have either the same frequency or tone as the emitted signal or is Doppler shifted from the emitted signal's tone in an amount that corresponds to movement of an object near the ultrasonic device 10. The general operation of an ultrasonic sensing sensor is described in detail below in the context of a touch-sensitive device. However, it is noted that although embodiments of ultrasonic operations and apparatus are described below in the context of a touch-sensitive device, such as a smart phone, these techniques and apparatus are applicable to a stand-alone ultrasonic sensing device (e.g., 10) or other combination device, such as home security systems, motion detection systems, collision avoidance systems for warehouse robots, parking assistant systems for vehicles, gesture recognition devices, communication between nodes of an computer network over modulated ultrasound waves, echolocation systems used for navigation, etc.

Some ultrasonic solutions may depend primarily on analysis of reflections to determine object information, such as an estimate of the object's velocity in the environment. However, emitted waves may also travel more complicated paths, including multiple reflections or diffractions, before returning to the system to be recorded. In this case the emitted waves may return to the system by multiple paths simultaneously, resulting in interference between the multiple returning waves.

Despite several successful applications, ultrasonic sensing systems remain vulnerable to interference from noise sources. For example, noise in the ultrasonic range from industrial machinery or high-speed trains can obscure ultrasound waves emitted from an ultrasonic sensing system and render such sensing system ineffective. Moreover, multiple systems that emit noise, such as multiple machinery systems or multiple smartphones, operating simultaneously near each other can interfere with each other, leading to erratic sensor responses that make it difficult to infer information about an object of interest.

Certain embodiments of this disclosure include systems and methods to mitigate issues from ultrasonic noise by finding optimized frequencies for the ultrasonic signals emitted from an ultrasonic system that manage noise issues with respect to the detected signals. In a specific example, the effects on the ultrasonic sensing system caused by such background noise is estimated and quantified during periodic time intervals. The estimated noise and metrics can then be used to select a new candidate frequency or frequency band at which this noise effect has a minimal effect on the ultrasonic sensing system and signal response results. The process may be repeated so that multiple candidate emission frequencies are tried until finding an optimum frequency that is expected to optimize performance of the ultrasonic sensing system in the presence of detected environmental background noise. In sum, this process maximizes the functionality of the ultrasonic sensing system in the presence of ultrasonic background noise.

One or more ultrasonic sensing devices may form part of a more complex sensing system for detecting and classifying nearby objects as further described below. For instance, the object-detection function of an ultrasonic sensing system can first (and periodically) be enhanced by determining an optimum frequency for improving the object-detection operation in the presence of background noise so that the background noise provides minimal contribution at the optimum frequency used during object detection operations. The object data collected by an ultrasonic sensing system may then be used in conjunction with other object sensing data collected from other sensing systems, such as touch data from objects near or on a touch screen, to facilitate an object classification process as further described below.

Figure 1B:
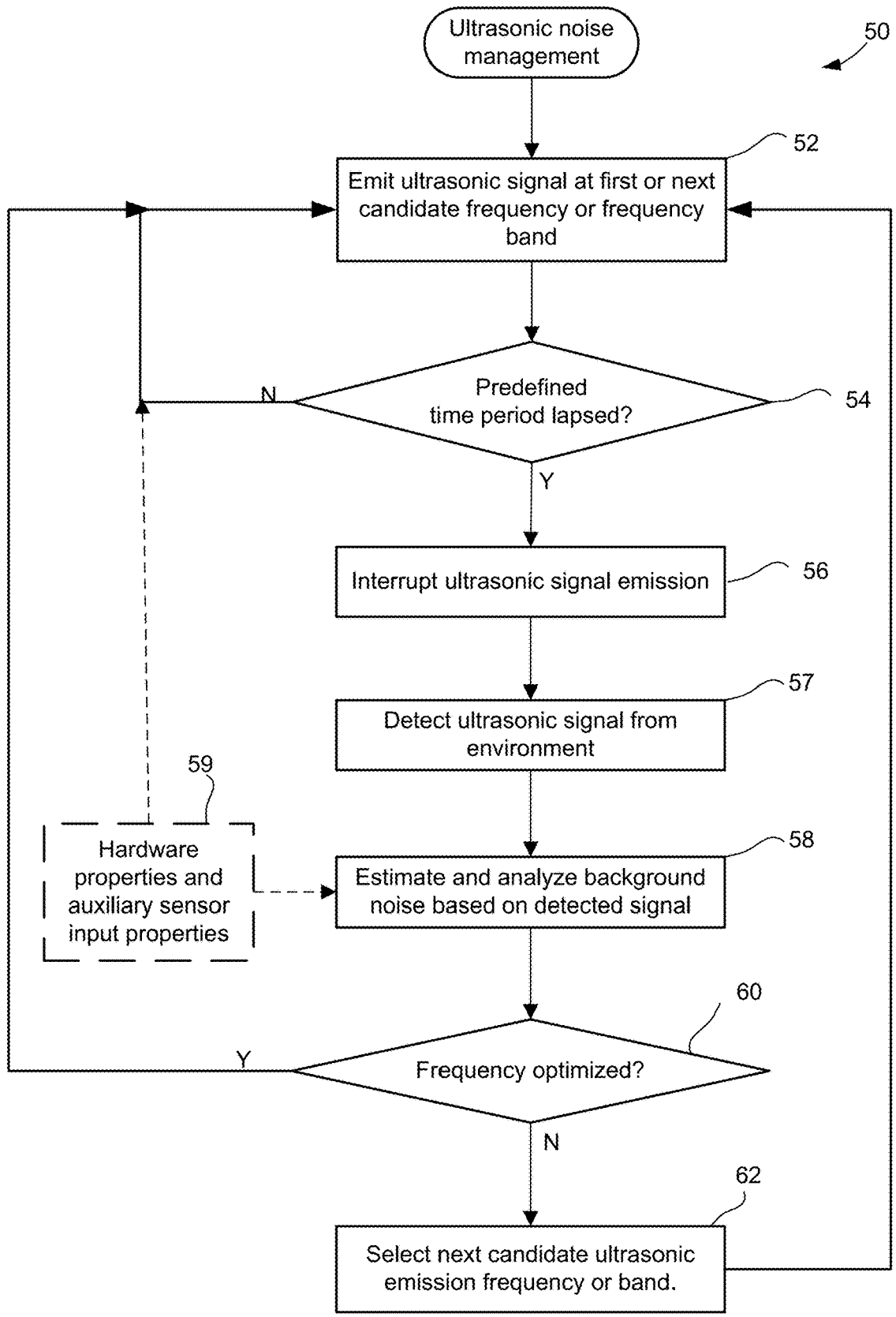
FIG. 1B is a flow chart illustrating a process for ultrasonic signal frequency optimization in accordance with one embodiment of the present invention.

FIG. 1B is a flow chart illustrating a process for ultrasonic signal frequency optimization in accordance with one embodiment of the present invention. Initially, an ultrasonic signal at a first selected candidate frequency or frequency band may be emitted in operation 52, such as emitted from speaker 12 of ultrasonic sensing system 10. Candidate frequencies can be selected from either a finite or infinite set. For instance, a 22 kHz or 23 kHz single-tone may be selected as a candidate frequency for single-tone ultrasound system. Alternatively, a real number from a range between about 22 kHz and about 23 kHz may be selected as a candidate frequency. In general, any frequency or band that is in the ultrasonic range, e.g., anything above the frequency range that is audible to humans, which is generally above about 20 kHz and up to 500 kHz, may be selected. Likewise, for systems that emit band-limited white noise, a candidate frequency range may be selected from an infinite set of frequency ranges.

After an ultrasonic signal at a candidate frequency or frequency band is emitted, it may then be determined whether a predefined time period has lapsed in operation 54. If the predefined time period has lapsed, the process may proceed to the next step. Otherwise, the ultrasonic signal simply continues to be emitted and ultrasonic sensing and analysis of proximate objects continues.

The predefined time period may be set to any suitable value. In one embodiment, the predefined time period is set to a value that corresponds to an average or mean time period between changes in a frequency profile of the background noise. Additionally, the predefined time period may be dynamically altered based on various external factors that affect frequency profile changes in the background noise in the environment. For instance, changes in the background noise's frequency profile may correspond to scheduled operation and shutdown (halting/starting/operating) of one or more machinery systems at certain time periods of the day/night. In this example, the predefined time period may be adjusted to different values on a schedule that correspond to each scheduled change in each nearby device's operational status that affects the background noise's frequency profile. One example for dynamically modifying the predefined time period includes ultrasonic-based proximity sensing applications where two or more systems operating nearby share their states, thereby, dynamically adjusting their behaviors such as after a time period so that they jointly minimize their chances of interfering each other. Other applications include ultrasonic sensing systems that estimate their own performance and can trigger a round of background detection when their performance drops below a predefined threshold. Yet another example includes ultrasonic sensing systems that can monitor the out-of-emission-band ultrasound due to only the environment and to trigger a round of background detection when the out-of-emission-band spectrum changes sufficiently. Another example may include ultrasonic sensing systems that have applications in which the timing of interesting events are not uniformly distributed, and these systems can use the statistical distribution of the interesting detected events to plan rounds of background estimation to minimize downtime during upcoming interesting events; etc.

In a system in which changes to the frequency profile of background noise is unknown or inconsistent, the predefined time period between rounds of background detection (as well as the duration of the background detection itself) may be selected to balance various factors, such as minimizing interruptions to the ultrasonic system's object-detection function, capturing typical changes in noise frequency profiles, meeting the system's power consumption requirements, minimizing potential instability in the choice of emission frequency or frequency band in a stable ultrasound environment, etc. The predefined time period may also be selected to correspond to how long it takes for the emitted tone to be eliminated from the environment and not affect detection and analysis of background noise that is received by the ultrasonic sensing system. In one example, the estimation process may be implemented every 5 minutes (e.g., 5 minutes has lapsed since the last estimation or since initialization of the ultrasonic sensing process), and the duration of the round of background detection (during which ultrasound is not emitted from the ultrasound system) may be 100 ms. Depending on the environment and objects in which the ultrasonic sensing system detect, the duration of the round of background detection can be at least the time for the sound to travel some multiple of the typical distance, in the form of:

$$\text{time} = N*\text{distance}/(\text{speed of sound in the medium})$$

In above time equation, N is chosen to be large enough that it is reasonable to assume that any echoes of the emission signal are gone from the environment. As an example, if the ultrasonic system is deployed in air, the speed of sound is approximately 343 m/s. If the ultrasonic system is primarily used for sensing the objects and environment within 10 meters, the duration of the round of background detection could be at least the time for a single echo to travel 10 m and back:

$$\text{time} = 2*(10 \text{ m})/(343 \text{ m/s}) = 0.0583 \text{ s} = 58.3 \text{ ms}$$

In addition to this time, the system would take a certain amount of time to record ultrasound from the background, analyze it, and decide on the optimal frequency or frequency band when emission resumes. In general, both the time between rounds of background detection and the duration of the time of the background detection are going to depend heavily on the application and expected environment of the ultrasonic sensing system, and would be determined in practice on an application-by-application basis.

In the illustrated embodiment, the ultrasound emission for the object-sensing process is interrupted (stopped) prior to and during the next noise estimation step. Halting of the emission is optional for all applications. However, stopping the ultrasonic emission allows the noise estimation process to estimate noise that is not due to the ultrasonic sensing system itself. That is noise from the environment can be isolated more easily from the system emission. If the signal emission is not interrupted, estimation results may be subject to interference from ultrasound emitted from the system itself. In this later example, the emitted audio signals will tend to interfere with the background noise. To account for this interference, the analysis process may include a step to estimate the interference and compensate such interference effects by subtracting it prior to the analysis process. Another simple, yet viable treatment, is to ignore the interference altogether; in this case, the current emission frequency is unlikely to be selected at the next iteration because of the interference from system itself.

An ultrasonic signal from the environment may then be detected in operation 57. For example, an ultrasonic noise signal having one or more frequencies may be received and detected by microphone 14. This detected noise signal may result from audio waves emitted and/or diffracted from one or more objects in the environment (20), such as machinery. The detected signal may also be the result of multiple ultrasonic signals from multiple noise sources, such as multiple pieces of machinery, interfering with each other.

The background noise may then be estimated and analyzed based on the detected signals in operation 58. For instance, the results of this analysis process may include obtaining amplitude metrics at each frequency of the detected noise. One example implementation is to breakdown the detected audio signals into both frequency and time domains (e.g., implementing a Fourier Transform process) so as to obtain amplitude metrics at each frequency in the frequency domain.

It may then be determined whether the selected emission frequency is optimized for inferring object information based on the noise estimation and analysis in operation 60. Although an ultrasonic system may record signals at all frequencies, signals that are scattered from surrounding objects will have about the same tone as the emission signal. Ideally, the background noise will be minimal at this emission tone. However, some background noise may have strong signals in the same band or tone as the emission signal. During object detection, a strong noise signal in the same band as the emission signal would result in the detected signal having a combination of both a strong noise signal and object signal, which may not be separable to determine which part of the signal corresponds to a nearby object and not noise. For example, it may be determined whether the current frequency of the emitted ultrasound signal corresponds to a noise signal or band that includes a relative strong amplitude at or near the current emission signal's frequency.

By way of example, once the noise is estimated and analyzed (e.g., quantified noise metrics are obtained), it may be determined whether the noise response amplitude at the emission frequency (or near the frequency) has a value that is about the same or higher than an average amplitude (or range of expected amplitudes) of a detected signal resulting from object detection. This decision may be made based on a statistical distribution of quantified noise metrics observed without the presence of strong noise signals. For instance, an ultrasound sensing system deployed in a factory may learn a statistical distribution of noise metric observations while only ambient noise contributes to the environment. Then, this distribution may be referenced by the system when it performs statistical tests in order to distinguish strong signals from average ones. If such statistical tests indicate the presence of strong noise near the emission frequency, it may then be determined that the current frequency requires adjustment to a next candidate frequency at which the noise response does not have a strong signal. In contrast, if the noise does not have a strong signal near the emission frequency, the current emission frequency may be determined to be optimum. Besides the statistical tests, there may be other factors that account for the decision to adjust the emission frequency. For example, a system may be known to perform optimally with an emission frequency selected from a certain range. Or, a system is used for a mission critical application where switching an emission frequency disrupts its continuous operation and results in a higher risk. In such cases, all factors may be weighted in a process of deciding to perform emission frequency adjustment.

If the current frequency is optimized, the process may be repeated to continue signal emission at the current frequency. If the current frequency is not optimized, however, a next candidate ultrasonic emission frequency or band may be selected in operation 62 and the process repeats with maintaining the current frequency as unchanged for signal emission.

The next frequency or band may be selected in any suitable manner so that it differs from the current frequency or band. If there is a strong noise signal from the environment in the same emission frequency or band, the next emission frequency or band is selected to move away from the previous emission frequency. In one example, the emission frequency is adjusted up or down by 1-2 kHz. In another example, emission frequency is adjusted to the frequency or band estimated to be corrupted least according to quantified noise metrics.

This frequency optimization process may also utilize any other suitable input that affects the detected noise signal and/or emission signal. As shown in FIG. 1B, this estimation and analysis operation 58 may also utilize parameter input 59 in the form of system properties that pertain to signal response, such as the signal-to-noise ratio of speakers and microphone. This parameter input may also include any available auxiliary sensor input. Auxiliary sensors can include sensors for measuring temperature, humidity, atmospheric pressure, etc. In a specific embodiment, the parameters may provide metrics for how the signal frequency response is affected by different parameter values. One example is different temperatures resulting in different frequency responses for the emitted and/or detected signals. In a specific example, different speaker frequency response curves are experimentally obtained for different parameter values, such as different temperatures, etc. That is, separate response curves may be obtained. Alternatively, a combined response curve may be utilized.

Some parameters that affect the frequency response of ultrasonic signals, which are emitted and/or detected, in different ways can be provided by a device manufacturer in the form of specifications (e.g., a speaker's response curve or signal to noise profile). Other parameters may be measured to obtain frequency response curves under different conditions, such as frequency response vs temperature; frequency response vs humidity, etc. The frequency response curves can then be considered when estimating and analyzing noise, as well as determining the optimum frequency for object-detection and classification. For instance, a speaker response curve may be used to improve the noise estimation and analysis by adjusting a selected candidate or optimum frequency or band based on currently sensed parameter values. These parameters can be combined with multiple auxiliary sensor inputs, and this combination could elucidate the statistical properties of noise estimates over a variety of conditions. By modeling a joint distribution, the noise estimation can be transformed into a more robust metric.

Measured parameter input values may also be used to determine the predefined time period for initiating or repeating the frequency optimization process. For instance, when temperature is measured and determined to have a significant temperature change that will likely significantly affect frequency response, a new optimum frequency may be determined (e.g., via the process of FIG. 1B).

Figure 1C:
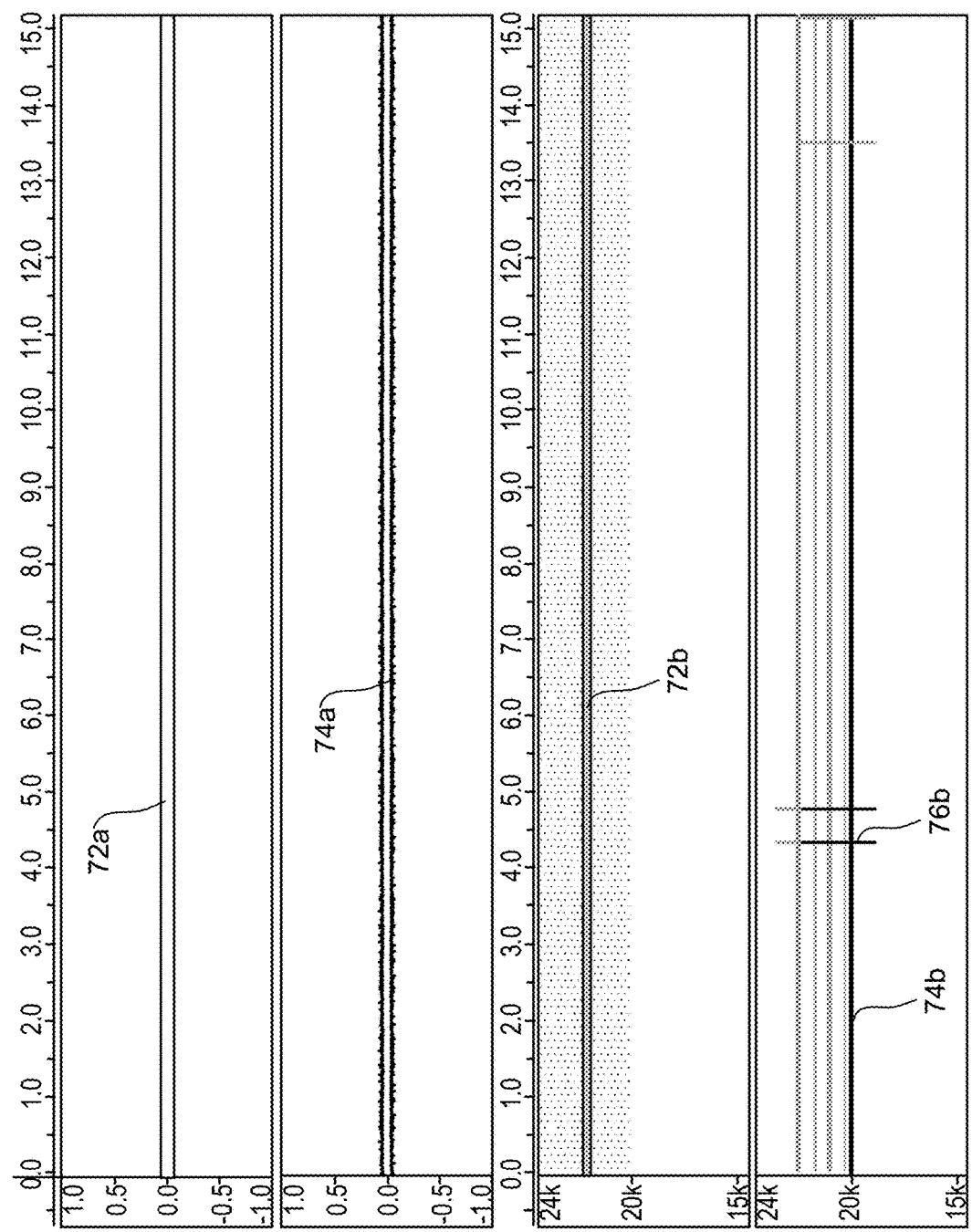
FIG. 1C illustrates a diagrammatic representation of a single-tone signal and a noise signal represented in both the time domain and the frequency domain.

FIG. 1C illustrates a diagrammatic representation of a single-tone signal and a noise signal represented in both the time domain and the frequency domain. Specifically, a single tone signal is represented in the time domain as signal 72a and in the frequency domain as signal 72b, while a noise signal is represented in the time domain as signal 74a and in the frequency domain as signal portions 74b and 76b by way of example. It is noted that the time domain graphs have amplitude on the y-axis, while the frequency domain graphs have frequency on the y-axis. Both frequency and time domain graphs have time on the x-axis. The frequency domain graphs represent spectrograms for the signals with darker shaded portions representing a higher amplitude than the lighter shade portions. All graphs correspond to about 15 seconds of recorded signals.

In the illustrated example, a single 22 kHz tone for an emission signal results in a strong signal at about 22 kHz. In this example, the noise has a variety of frequencies, including a strong signal 74b at around 20 kHz and other smaller but significant noise signals up to about 23 kHz, which includes the frequency of the emission tone frequency. Thus, the emission frequency may be adjusted to a value that may result in a detected signal that is outside the frequency range of the strongest portions of the noise signal, such as 24 kHz or 25 kHz in the presence of noise.

In an alternative embodiment, one or more components of the quantified noise response may be subtracted from the detected signals during ultrasonic sensing. That is, strong noise signal components may be subtracted from the detected signal during normal object-detecting operation of the ultrasonic sensing system.

Of course, techniques and systems described herein can be applied to other types of sound waves tailored to specific applications. It is also noted that embodiments of the present invention may be applied to any type of noise, such as white, pink, and brown noise. The frequency domain representation may be analyzed to determine whether the amplitude of the background noise at the emission frequency is larger than other frequencies. If the frequency of the emitted ultrasonic signal corresponds to a relatively strong noise signal at the same frequency (or Doppler-shifted frequency) at the same frequency of the emission signal, the current frequency may be determined to be suboptimal.

As described above, the ultrasonic system (e.g., 10) may be optionally part of another type of system that includes additional sensors and components for analyzing sensed signals, including ultrasonic signals. For instance, an ultrasonic proximity sensing system may be employed in bezelless smartphones with touch screens or other types of touch screen devices. Other example systems include systems described further above, including home security systems, motion detection systems, collision avoidance systems for warehouse robots, parking assistant systems for vehicles, etc.

In a touch screen device, the ultrasonic system can facilitate discernment of certain gesture with respect to the touch screen. For instance, a phone call pick-up gesture may be identified. Identification of a specific gesture may also enable the smartphone to react intelligently and adapt to the user's actions (e.g., turning off the screen during a phone call). Several embodiments of a proximity system with both ultrasonic and touch sensing devices and techniques for using such systems are described further in U.S. application Ser. No. 16/457,293, filed Jun. 28, 2019, entitled DETECTING OBJECT PROXIMITY USING TOUCH SENSITIVE SURFACE SENSING AND ULTRASONIC SENSING, by Taihei Munemoto et al., which application is incorporated herein by reference in its entirety for all purposes.

Figure 2A:
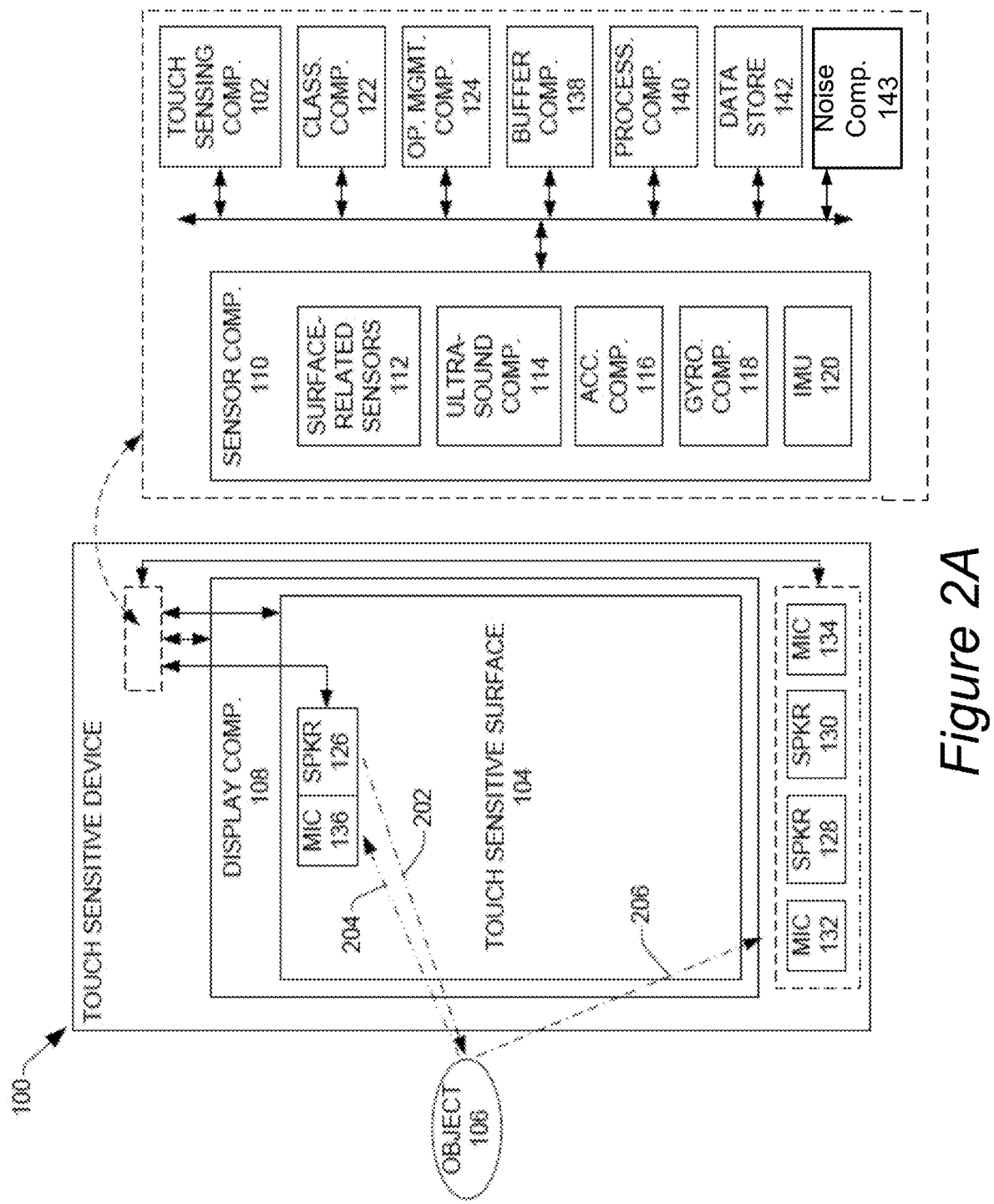
FIGS. 2A and 2B illustrate block diagrams of a front view and a side view, respectively, of a touch sensitive device that can utilize ultrasonic audio signals in accordance with one embodiment of the disclosed subject matter.
Figure 2B:
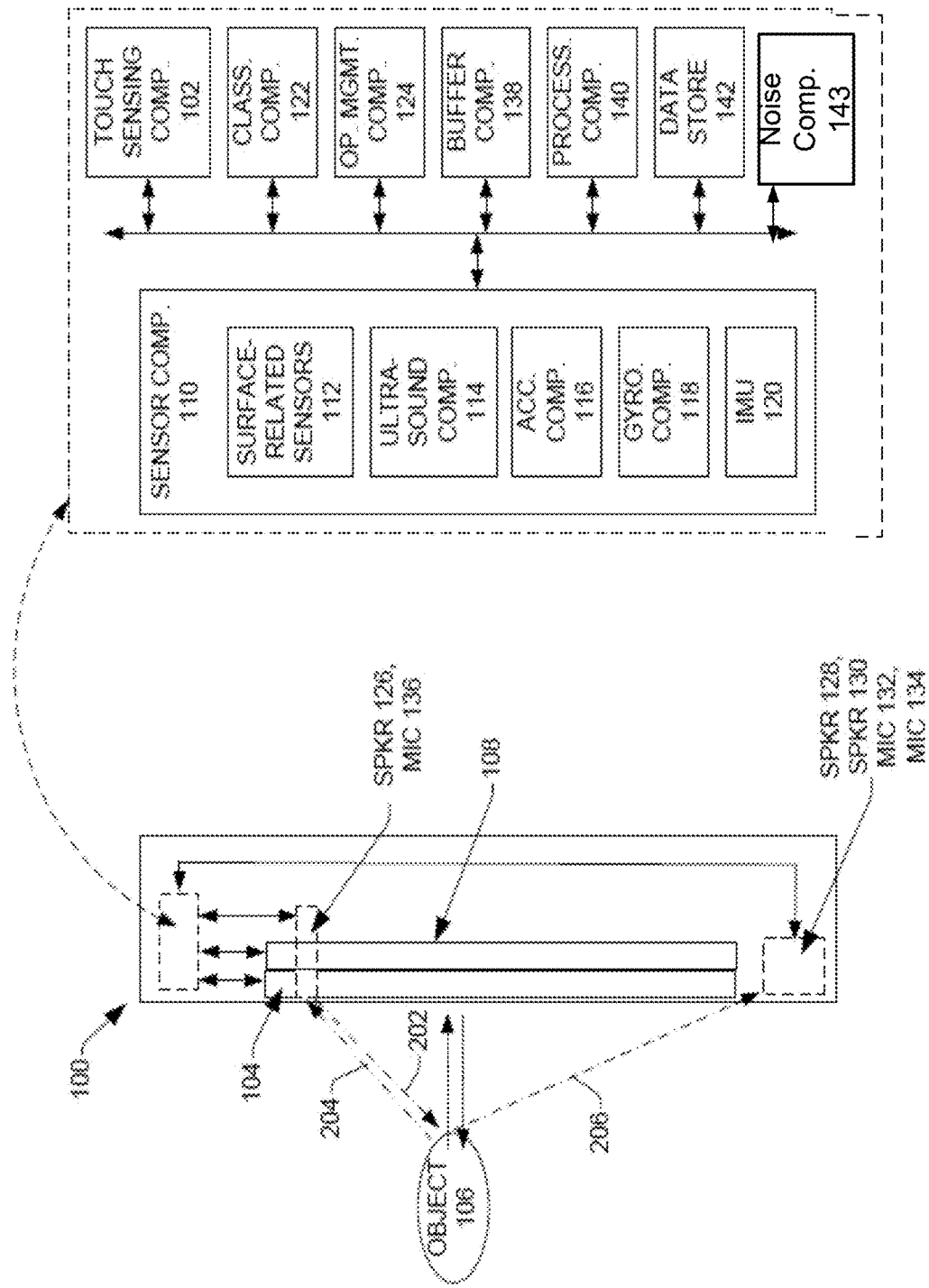

FIGS. 2A and 2B illustrate block diagrams of a front view and a side view, respectively, of a touch sensitive device 100 that can utilize ultrasonic audio signals to determine a classification of a touch or hover interactions of an object with a touch sensitive surface of the touch sensitive device, in accordance with one embodiment of the disclosed subject matter. The touch sensitive device 100 can be or can comprise, for example, a mobile phone (e.g., a cellular phone and/or smart phone), a computer, a display table, a personal digital assistant (PDA), an electronic tablet or notebook (e.g., a touch sensitive graphic tablet or notebook), a web pad, electronic bodywear (e.g., a smart watch or other electronic bodywear that comprises a touch sensitive surface), an electronic gaming device, an electronic workstation, a television, an Internet protocol (IP) television, a set-top box, a device (e.g., touch sensitive device) in or integrated with a vehicle, a touch pad, a track pad, or other type of device.

The touch sensitive device 100 can comprise a touch sensing component 102 (touch sensing comp. 102) that can comprise or be associated with a touch sensitive surface 104 that can sense when an object(s) 106 (e.g., finger(s) of a user, palm of the user, ear or face of the user, other body part of the user, or stylus) has been brought into contact with the touch sensitive surface 104 or is in proximity to (e.g., is hovering over and/or in proximity to) the touch sensitive surface 104. The touch sensitive surface 104 can be associated with (e.g., overlaid on) a display component 108 (display comp. 108), which can comprise a display screen that can present visual and/or textual content to a user. The touch sensitive surface 104 can have a size and shape that can be coextensive with or can correspond to, or at least can be substantially coextensive with or can substantially correspond to, the size and shape of a presentation area of the display screen of the display component 108.

The touch sensitive device 100 also can comprise a sensor component 110 (sensor comp. 110) that can comprise a set of sensors, wherein respective sensors of the set of sensors can sense respective conditions (e.g., contact or hover conditions, pressure conditions, and/or motion conditions associated with the device 100, . . . ) of or associated with the touch sensitive device 100. The set of sensors of the sensor component 110 can comprise surface-related sensors 112 (e.g., touch sensors) that can be part of or associated with the touch sensing component 102 and the touch sensitive surface 104. The surface-related sensors 112 can be configured to sense when an object(s) 106 is in contact with the touch sensitive surface 104 and generate sensor data, such as touch surface data (e.g., touch surface or touch screen data), relating to contact with the touch sensitive surface 104 by the object(s) 106, as more fully described herein. In some embodiments, the surface-related sensors 112 can sense when an object(s) 106 is in proximity to (e.g., is hovering over and/or in proximity to) the touch sensitive surface 104. The sensor data can be employed to facilitate determining a classification relating to a contact or an association (e.g., hover) of an object(s) 106 with the touch sensitive surface 104, as more fully described herein.

The set of sensors of the sensor component 110 also can include other sensors that can be configured to sense various conditions of or associated with the device 100. In accordance with various embodiments, the sensor component 110 can comprise an ultrasound component 114 (ultrasound comp. 114) comprising an ultrasonic sensor, an accelerometer component 116 (acc. comp. 116) comprising one or more accelerometers, a gyroscope component 118 (gyro. comp. 118) comprising one or more gyroscopes, an IMU 120, and/or other sensors. These other sensors (e.g., ultrasound component 114, accelerometer component 116, gyroscope component 118, IMU or inertial measurement unit 120, ...) can sense or detect motion (e.g., movement) of an object 106 in relation to the device 100, orientation of the device 100 or the object 106, a distance of the object 106 from the device 100 (e.g., a distance of the object 106 from the touch sensitive surface 104), and/or other conditions of or associated with the device 100 or object 106, as more fully described herein. The other sensor data can be employed to facilitate determining a classification relating to a contact (e.g., touch) or an association (e.g., hover) of object(s) 106 with respect to the touch sensitive surface 104, as more fully described herein.

In some embodiments, the touch sensitive device 100 can comprise a classification component 122 (class. comp. 122) that can classify or determine touch or hover interactions of objects 106 with the touch sensitive surface 104 based at least in part on the results of analyzing sensor data received from the sensor component 110, in accordance with the defined classification criteria. The classification component 122 can monitor and receive sensor data (e.g., data streams from the various sensors of the sensor component 110), such as touch surface data, associated with the touch sensitive surface 104 obtained from the surface-related sensors 112, other sensor data (e.g., ultrasound data, accelerometer data, gyroscope data, and/or IMU data, ...) obtained from the other sensors, and/or metadata associated with the device 100. The classification component 122 can monitor the sensor data and the other sensor data to facilitate detecting touch or hover interactions or touch interactions of an object 106 with the touch sensitive surface 104 of the device 100. The classification component 122 can analyze the touch surface data, the other sensor data, and/or the metadata, and can generate analysis results based at least in part on the analysis of such data.

In some embodiments, as part of the analysis of the touch surface data (e.g., touch screen data), the other sensor data (e.g., ultrasound data, accelerometer data, gyroscope data, and/or IMU data, ...), and/or the metadata, the classification component 122 can extract characteristic information (e.g., information regarding or indicating characteristics, features, and/or structures relating to the touch or hover interaction) from the touch surface data, the other sensor data, and/or the metadata. For instance, the classification component 122 can utilize desired algorithms (e.g., machine learning algorithms relating to identifying characteristics or features regarding touch or hover interactions of the object 106 with respect to the touch sensitive surface 104 and associated touch display screen) to facilitate identifying and extracting the characteristic information from the touch surface data, the other sensor data, and/or the metadata. The classification component 122 can utilize the characteristic information to discriminate or distinguish between different types of touch or hover interactions (e.g., unintentional touch or hover interaction, or intentional touch interaction) of objects 106 (e.g., a finger(s) of the user, ear or face of the user, a palm of the user, another body part of the user, a stylus, or another type of object) with the touch sensitive surface 104.

In certain embodiments, as part of the analysis of the sensor data, the classification component 122 can utilize pattern analysis, including pattern recognition analysis, techniques, tools, and algorithms, to identify or determine patterns relating to the touch or hover interactions (e.g., patterns of contact or association (e.g., hovering) relating to the touch or hover interaction) for an object(s) 106 with the touch sensitive surface 104, in accordance with the defined classification criteria, as more fully described herein. For instance, as part of the pattern analysis, the classification component 122 can compare a pattern(s) relating to a touch or hover interaction of an object 106 with the touch sensitive surface 104 to known patterns for touch or hover interactions, such as known patterns for various types of intentional touch interactions and known patterns for various types of unintentional touch or hover interactions, to facilitate determining, based at least in part on the results of such pattern analysis (e.g., comparing of patterns), whether the touch or hover interaction is an intentional touch interaction or an unintentional touch or hover interaction and/or the particular type of touch or hover interaction (e.g., intentional finger touch, unintentional finger touch, unintentional ear (or face) touch, or unintentional palm touch, ...).

It can be desirable to detect and/or classify interactions, such as hover interactions, of an object 106 with the touch sensitive surface 104, and/or other characteristics of such interactions, before the object 106 comes into contact with the touch sensitive surface 104 or even if the object 106 ultimately does not come into contact with the touch sensitive surface 104. Detection and classification of such interactions can enable the device 100 (e.g., operations management component 124 (op. mgmt. comp. 124)) to select desirable decisions and take selected actions with regard to operation of the device 100, including the touch sensitive surface 104 and display screen of the display component 108, as more fully described herein. In accordance with various embodiments, the device 100 can utilize the ultrasound component 114 to generate ultrasound audio signals and receive reflected ultrasound audio signals that have been reflected off of an object 106 in proximity to the touch sensitive surface 104 to facilitate detecting that the object 106 is in proximity to the touch sensitive surface 104, determining whether the object 106 is moving toward the touch sensitive surface 104, determining whether the object 106 is moving away from the touch sensitive surface 104, determining whether the object 106 is not moving in relation to the touch sensitive surface 104, determining a classification of the hover interaction (or impending touch interaction) of the object 106 with the touch sensitive surface 104, and/or other characteristics associated with the hover interaction of the object 106 with the touch sensitive surface 104.

In certain applications, the ultrasound component 114 can generate an audio signal, which can comprise at least a first frequency (e.g., a first ultrasonic frequency) or band selected from multiple frequencies or bands. For example, the audio signal can be an ultrasonic audio signal. The device 100 can comprise one or more speakers, such as speaker (spkr) 126, 128, and/or 130, that can be utilized to emit the audio signal 202 from the device 100.

The speaker 126 can be located in proximity to a top portion of the touch sensitive surface 104 on the side (e.g., face) of the device 100 where the touch sensitive surface 104 is located. Speakers 128 and 130 can be located at or near the bottom side of the device 100. In some embodiments, the ultrasound component 114 can emit the audio signal 202 via one speaker (e.g., speaker 126 on the face of the device 100). In other embodiments, the ultrasound component 114 can emit the audio signal 202 via multiple speakers (e.g., speakers 126, 128, and/or 130).

When an object 106 is located in proximity to the touch sensitive surface 104, and/or is moving in relation to the touch sensitive surface 104, the audio signal 202 can hit the surface of the object 106 and can produce a reflected audio signal 204 that can be reflected off of the surface of the object 106 back towards the device 100. If the object 106 is moving in relation to the touch sensitive surface 104, the reflected audio signal 204 can have a different frequency (e.g., a higher or lower frequency), or different distribution of frequencies, than the frequency (e.g., first frequency) or distribution of frequencies of the audio signal 202 emitted by the device 100 due to a frequency shift (e.g., Doppler shift) resulting from the Doppler effect.

Additionally, the ultrasound component 114 can be operable to receive ultrasound audio signals emitted or reflected from any environmental objects that are processed and analyzed to select an optimum frequency or band for other applications of the ultrasound component 114, such as object 106 classification. In certain embodiments, the ultrasound emission for object-detection is halted. In other examples, the frequency optimization process may be performed while the ultrasound component 114 is emitting ultrasound audio signals for concurrent object status detection.

The device 100 also can comprise one or more microphones, such as microphone (mic) 132, 134, and/or 136, that can sense or detect the reflected audio signal 204. The reflected audio signal can have at least a second frequency. The reflected audio signal 204 can be a reflected ultrasonic audio signal. Typically, the second frequency of the reflected audio signal 204 can be higher or lower than the first frequency of the audio signal 202 if the object 106 is moving towards or moving away from the touch sensitive surface 104, respectively, and the second frequency can be the same as the first frequency if the object 106 is not moving in relation to the touch sensitive surface 104. The ultrasound component 114 can receive the detected reflected audio signal 204 via the one or more microphones (e.g., microphone(s) 132, 134, and/or 136).

It is to be appreciated and understood that, while the audio signal 202 is described as being emitted from speaker 126, alternatively or additionally, the audio signal 202 can be emitted from speaker 128 and/or speaker 130. It also is to be appreciated and understood that, while the reflected audio signal 204 is described as being sensed, detected, and/or received by the microphone 136, alternatively or additionally, the reflected audio signal 204 (or another reflected audio signal reflected off of the object 106) can be sensed, detected, and/or received by microphone 132 and/or microphone 134.

The one or more microphones, such as microphone (mic) 132, 134, and/or 136, can also sense or detect signals reflected/emitted from noise sources in the environment.

The device may also include a noise component (Noise Comp. 143) for optimizing the frequency or band for other ultrasonic applications, such as object classification, as described further herein. The noise component 143 may operate to analyze received ultrasonic signals (and sensor data) as further described herein. The noise component may operate to optimize the ultrasonic frequency or band of the emission signals output by the ultrasonic component 112 so that a detected ultrasonic signal can be used by other components, such as classification component 122, prior to or periodically in conjunction with the operation of these other components. One or more of the other components may be disabled during operation of the noise component 143 although disabling is not required.

The classification component 122 can receive information (e.g., sensor data) regarding the audio signal 202 and/or the reflected/diffracted audio signal 204 from the ultrasound component 114. The audio signal 202 can use a frequency or band that is optimized by the noise component 143 to manage noise issues. The classification component 122 can analyze the audio signal 202 and/or the reflected audio signal 204 to facilitate determining a movement status of the object 106 in relation to the touch sensitive surface 104. For instance, the classification component 122 can determine a movement status of the object 106 in relation to the touch sensitive surface 104, based at least in part on a frequency shift between the first frequency of the audio signal 202 and the second frequency of the reflected audio signal 204. The classification component 122 can utilize the analysis results from analyzing the audio signal 202 and/or reflected audio signal 204, including the determined movement status of the object 106 in relation to the touch sensitive surface 104, to classify or facilitate classifying the interaction of the object 106 with the touch sensitive surface 104. For instance, based at least in part on the analysis results obtained from analyzing the audio signal 202 and/or reflected audio signal 204, including the determined movement status of the object 106 in relation to the touch sensitive surface 104, and/or other analysis results determined from other sensor data (e.g., touch surface data, accelerometer data, gyroscope data, or IMU data), the classification component 122 can classify the interaction (e.g., hover interaction, impending touch interaction, or touch interaction) of the object 106 with the touch sensitive surface 104.

To facilitate enhancing the detection of movement of an object 106 in relation to the touch sensitive surface 104 and classification of an interaction (e.g., hover or touch interaction) of the object 106 with the touch sensitive surface 104, the ultrasound component 114 can generate an audio signal 202 comprising a distribution (e.g., first distribution) of frequencies (e.g., ultrasonic frequencies). Using audio signals with multiple frequencies can enable the classification component 122 to better gauge the movement or interaction of the object 106 in relation to the touch sensitive surface 104 and/or distinguish between different types of movement or different types of interactions of an object 106 in relation to the touch sensitive surface 104. Additionally, using audio signals with multiple frequencies or bands that are also optimized for a noisy environment can provide more accurate and reliable results for object movement or interaction, as well as object classification.

For instance, the ultrasound component 114 can generate an audio signal 202, comprising a first distribution of frequencies (e.g., a first statistical distribution of frequencies). The ultrasound component 114 can emit the audio signal 202 via one or more speakers (e.g., speaker(s) 126, 128, and/or 130) of the device 100 (e.g., toward the object 106). The audio signal 202 can bounce or be reflected off of an object 106, if the object 106 is in proximity to (e.g., is within a defined distance of) the touch sensitive surface 104, wherein the reflected audio signal 204 can comprise a second distribution of frequencies. Typically, with regard to a particular frequency of an emitted audio signal 202 (e.g., a particular frequency of the first distribution of frequencies of the emitted audio signal 202), a corresponding frequency of the reflected audio signal 204 (e.g., a corresponding frequency of the second distribution of frequencies of the reflected audio signal 204) can be higher or lower than the particular frequency of the audio signal 202 if the object 106 is moving towards or moving away from the touch sensitive surface 104, respectively, and the corresponding frequency can be the same as the particular frequency if the object 106 is not moving in relation to the touch sensitive surface 104. The corresponding frequency of the reflected audio signal 204 can be a frequency that can correspond to, and be the frequency that results from, the reflection of the portion of the audio signal 202 having the particular frequency off of the object 106. The one or more microphones (e.g., microphone(s) 132, 134, and/or 136) can receive, sense, and/or detect the reflected audio signal 204 comprising the second distribution of frequencies. The ultrasound component 114 can receive the reflected audio signal 204 via the one or more microphones (e.g., microphone(s) 132, 134, and/or 136).

The classification component 122 can analyze the audio signal 202 and the reflected audio signal 204 to facilitate determining a movement status of the object 106 in relation to, and/or classifying an interaction of the object 106 with, the touch sensitive surface 104. In some embodiments, the classification component 122 can determine a movement status of the object 106 in relation to the touch sensitive surface 104, based at least in part on a distribution of frequency shifts between the first distribution of frequencies of the audio signal 202 and the second distribution of frequencies of the reflected audio signal 204. In other embodiments, the classification component 122 can determine a classification of the interaction (e.g., hover interaction or (impending) touch interaction) of the object 106 with the touch sensitive surface 104 based at least in part on the results of the analysis of the audio signal 202 and/or reflected audio signal 204. In still other embodiments, the classification component 122 can determine a classification of the interaction (e.g., hover interaction or (impending) touch interaction) of the object 106 with the touch sensitive surface 104 based at least in part on the results of the analysis of the audio signal 202 and/or reflected audio signal 204 and/or other analysis results determined from the analysis of other sensor data (e.g., touch surface data, accelerometer data, gyroscope data, and/or IMU data) received by the classification component 122 from other sensors of the sensor component 110.

For instance, if a distribution of frequency shifts between the first distribution of frequencies of the audio signal 202 and the second distribution of frequencies of the reflected audio signal 204 comprises a subset (e.g., a concentration) of frequency shifts that are lower (e.g., a concentration of frequencies of the reflected audio signal are shifted lower than the corresponding frequencies of the audio signal), this can indicate that the object 106 is moving away from the touch sensitive surface 104, and/or can indicate that the object 106 is moving away from a particular location of the touch sensitive surface 104 (e.g., moving away from a top portion of, a center portion of, a bottom portion of, or a particular button or control on or associated with the touch sensitive surface 104), and/or can indicate the type of object 106 (e.g., a finger(s) of the user, an ear and/or face of the user, a palm of the user, or a stylus, . . . ).

If, instead, a distribution of frequency shifts between the first distribution of frequencies of the audio signal 202 and the second distribution of frequencies of the reflected audio signal 204 comprises a subset (e.g., a concentration) of frequency shifts that are higher (e.g., a concentration of frequencies of the reflected audio signal 204 are shifted higher than the corresponding frequencies of the audio signal 202), this can indicate that the object 106 is moving closer to the touch sensitive surface 104, and/or can indicate that the object 106 is moving towards a particular location (e.g., a top portion of, a center portion of, a bottom portion of, or a particular button or control on or associated with) on the touch sensitive surface 104, and/or can indicate the type of object 106 (e.g., a finger(s) of the user, an ear and/or face of the user, a palm of the user, or a stylus, . . . ).

For instance, respective (e.g., different) distributions of frequency shifts between a distribution of frequencies of an audio signal 202 and another distribution of frequencies of a reflected audio signal 204 (e.g., reflected off of an object 106) can indicate respective locations (e.g., a top portion of, a center portion of, a bottom portion of, a left side of, and/or a right side of; and/or a particular button or control on or associated with the touch sensitive surface 104) on the touch sensitive surface and/or can indicate respective types of objects (e.g., a finger(s) of the user, an ear and/or face of the user, a palm of the user, or a stylus, . . . ), based at least in part on respective types (e.g., frequency shift higher, frequency shift lower, or a combination thereof) and/or respective locations (e.g., frequency locations) of respective concentrations, and/or respective amounts, of frequency shifts of the respective distributions of frequency shifts. For example, a first distribution of frequency shifts between a distribution of frequencies of an audio signal 202 and another distribution of frequencies of a reflected audio signal 204 (e.g., reflected off of an object 106) can indicate that a finger of a user is moving toward a center-right portion (e.g., a button or control in the center-right portion) of the touch sensitive surface 104. The classification component 122 can analyze the ultrasound data (e.g., the first distribution of frequency shifts, the distribution of frequencies of the audio signal 202, and/or the other distribution of frequencies of the reflected audio signal 204). Based at least in part on the results of such analysis of the ultrasound data (and the training of the classification component 122), the classification component 122 can classify the interaction (e.g., hover (or impending touch) interaction) with the touch sensitive surface 104 as a hover (or impending touch) interaction of the finger of the user with the center-right portion (e.g., a button or control in the center-right portion) of the touch sensitive surface 104, and/or that such interaction is intentional, or at least can determine that the ultrasound data indicates the hover (or impending touch) interaction of the finger of the user with the center-right portion of the touch sensitive surface 104 and/or such interaction is intentional.

As another example, a second distribution of frequency shifts between a distribution of frequencies of an audio signal 202 and another distribution of frequencies of a reflected audio signal 204 (e.g., reflected off of an object 106) can indicate that an ear of a user is moving toward a center-top portion (e.g., near the speaker 126 located in a via in the center-top portion) of the touch sensitive surface 104. The classification component 122 can analyze the ultrasound data (e.g., the second distribution of frequency shifts, the distribution of frequencies of the audio signal, and/or the other distribution of frequencies of the reflected audio signal). Based at least in part on the results of this analysis of this ultrasound data (and the training of the classification component 122), the classification component 122 can classify the interaction (e.g., hover (or impending touch) interaction) with the touch sensitive surface 104 as a hover (or impending touch) interaction of the ear of the user with the center-right portion (e.g., near the speaker 126 located in a via in the center-top portion) of the touch sensitive surface 104, and/or that such interaction is unintentional (e.g., unintentional in that the user does not intend to press or manipulate a button or control associated with the touch sensitive surface 104), or at least can determine that the ultrasound data indicates the hover (or impending touch) interaction of the ear of the user with the center-right portion of the touch sensitive surface 104 and/or such interaction is unintentional.

As still another example, a third distribution of frequency shifts between a distribution of frequencies of an audio signal 202 and another distribution of frequencies of a reflected audio signal 204 (e.g., reflected off of an object 106) can indicate that two fingers of a user are moving toward a center-left portion of the touch sensitive surface 104 (e.g., as the user picks up and grips the device 100 in the user's hand). The classification component 122 can analyze the ultrasound data (e.g., the third distribution of frequency shifts, the distribution of frequencies of the audio signal, and/or the other distribution of frequencies of the reflected audio signal). Based at least in part on the results of this analysis of this ultrasound data (and the training of the classification component 122), the classification component 122 can classify the interaction (e.g., hover (or impending touch) interaction) with the touch sensitive surface 104 as a hover (or impending touch) interaction of the two fingers of the user with the center-left portion of the touch sensitive surface 104, and/or that such interaction is unintentional, or at least can determine that the ultrasound data indicates the hover (or impending touch) interaction of the two fingers of the user with the center-left portion of the touch sensitive surface 104 and/or such interaction is unintentional.

As yet another example, a fourth distribution of frequency shifts between a distribution of frequencies of an audio signal 202 and another distribution of frequencies of a reflected audio signal 204 (e.g., reflected off of an object 106) can indicate that two fingers of a user are moving toward a center portion of the touch sensitive surface 104 (e.g., as the user is intending to perform an operation using a multi-touch gesture). The classification component 122 can analyze the ultrasound data (e.g., the fourth distribution of frequency shifts, the distribution of frequencies of the audio signal 202, and/or the other distribution of frequencies of the reflected audio signal 204). Based at least in part on the results of this analysis of such ultrasound data (and the training of the classification component 122), the classification component 122 can classify the interaction (e.g., hover (or impending touch) interaction) with the touch sensitive surface 104 as a hover (or impending touch) interaction of the two fingers of the user with the center portion of the touch sensitive surface 104, and/or that such interaction is intentional, or at least can determine that the ultrasound data indicates the hover (or impending touch) interaction of the two fingers of the user with the center portion of the touch sensitive surface 104 and/or such interaction is intentional.

In some embodiments, the classification component 122 can determine a movement status of the object 106 in relation to the touch sensitive surface 104 and/or determine a classification of the interaction (e.g., hover interaction or (impending) touch interaction) of the object 106 with the touch sensitive surface 104, based at least in part on the results of analyzing the distribution of frequencies of the reflected audio signal 204 without having to explicitly analyze the distribution of frequencies of the emitted audio signal 202 and/or the distribution of frequency shifts between the emitted audio signal 202 and the reflected audio signal 204, in accordance with the defined classification criteria. For instance, the classification component 122 can know (e.g., explicitly implicitly know) the characteristics (e.g., frequency distribution, intensity level, and/or location of emission, . . . ) of the emitted audio signal 202 (e.g., audio signal comprising a particular distribution of frequencies) without having to analyze the emitted audio signal 202. For example, the audio signal 202 emitted by the device 100 can be a same or constant audio signal that can be known by the classification component 122, or the classification component 122 can know or be made aware of when a different audio signal (e.g., different audio signal having a different distribution of frequencies) is being emitted by the device 100. The classification component 122 can analyze the reflected audio signal 204, and knowing (e.g., implicitly or explicitly knowing) the distribution of frequencies of the audio signal 202 (and/or other characteristics of the audio signal 202) and/or knowing (e.g., implicitly or explicitly knowing) the distribution of frequency shifts between the emitted audio signal 202 and the reflected audio signal 204 (e.g., from the results of analyzing the frequency distribution of the reflected audio signal 204), the classification component 122 can determine the movement status of the object 106 in relation to the touch sensitive surface 104 and/or determine the classification of the hover or touch interaction of the object 106 with the touch sensitive surface 104, based at least in part on the results of the analysis of the reflected audio signal 204.

Additionally or alternatively, the classification component 122 can be trained, as more fully described herein, to be able to determine a distribution of frequency shifts between the distribution of frequencies of the emitted audio signal 202 and the distribution of frequencies of the reflected audio signal 204, based at least in part on the results of analyzing the distribution of frequencies of the reflected audio signal 204. That is, the training of the classification component 122 can enable the classification component 122 to explicitly or implicitly know or determine the distribution of frequency shifts between the distribution of frequencies of the emitted audio signal 202 and the distribution of frequencies of the reflected audio signal 204, and/or the movement status of the object 106 in relation to the touch sensitive surface 104, and/or the classification of the interaction (e.g., hover interaction or (impending) touch interaction) of the object 106 with the touch sensitive surface 104, based at least in part on the results of the classification component 122 analyzing the distribution of frequencies of the reflected audio signal 204.

As disclosed, the device 100 can comprise one or more microphones, such as microphone(s) 132, 134, and/or 136, that can receive, sense, and/or detect a reflected audio signal that has been reflected off of an object 106. In certain embodiments, the ultrasound component 114 can emit an audio signal 202 via a speaker (e.g., speaker 126), and, in response to the audio signal 202 interacting with (e.g., reflecting off of) an object 106 to produce reflected audio signals, respective microphones, such as microphone 132, microphone 134, and/or microphone 136) can sense and/or receive respective reflected audio signals. For instance, microphone 136 can sense and/or receive the reflected audio signal 204 comprising first characteristics and microphone 132 can receive another reflected audio signal 206 comprising second characteristics. The characteristics of the reflected audio signals 204 and 206 can relate to, for example, an intensity level of a reflected audio signal as received by a microphone, a time of arrival of a reflected audio signal at a microphone, an amount of time between emission of the audio signal 202 and the time of arrival of a reflected audio signal at a microphone, and/or a frequency or distribution of frequencies of a reflected audio signal. The ultrasound component 114 and/or classification component 122 can receive sensor data relating to the reflected audio signal 204 comprising the first characteristics and the other reflected audio signal 206 comprising the second characteristics from the microphones 136 and 132, respectively.

The classification component 122 can analyze the sensor data relating to the reflected audio signal 204 comprising the first characteristics and the other reflected audio signal 206 comprising the second characteristics. Based at least in part on the results of analyzing such sensor data, the classification component 122 can determine the first characteristics of the reflected audio signal 204 and the second characteristics of the other reflected audio signal 206, and can determine a difference in intensity levels between the reflected audio signal 204 and the other reflected audio signal 206, a difference in times of arrival between the reflected audio signal 204 and the other reflected audio signal 206, a difference in amounts of time between emission of the audio signal 202 and the time of arrival of the reflected audio signal 204 and the time of arrival of the other reflected audio signal 206, a difference in frequencies of frequency distributions of the reflected audio signal 204 and the other reflected audio signal 206, and/or other differences between other characteristics of the first characteristics and second characteristics. As part of the analysis, the classification component 122 also can know or determine (e.g., via analysis of the audio signal 202) characteristics of the audio signal 202 (e.g., intensity level of the audio signal 202, time of emission of the audio signal 202, and/or frequency or frequency distribution of the audio signal 202, . . . ).

Based at least in part on the analysis results, the classification component 122 can determine a movement status of the object 106 in relation to the touch sensitive surface 104, classify a hover or touch (or impending touch) interaction of the object 106 with the touch sensitive surface 104, including determining or classifying the type of object that the object 106 is, determine a distance (e.g., the proximity) between the object 106 and the touch sensitive surface 104, and/or determine the location on the touch sensitive surface 104 (and/or button or control associated with the touch sensitive surface 104 and associated display screen) that the object 106 is hovering over or is expected to touch. For instance, if the first intensity level of the reflected audio signal 204 is stronger or higher than the second intensity level of the other reflected audio signal 206, this can indicate that the object 106 is closer to the location of the microphone 136 than the location of the microphone 132, and the classification component 122 can determine or infer that the object 106 is closer to the location of the microphone 136 than the location of the microphone 132, and accordingly, the object 106 can be closer to a portion of the touch sensitive surface 104 that is in proximity to the microphone 136 than another portion of the touch sensitive surface 104 that is in proximity to the microphone 132. Conversely, if the second intensity level of the reflected audio signal 204 is weaker or lower than the second intensity level of the other reflected audio signal 206, this can indicate that the object 106 is closer to the location of the microphone 132 than the location of the microphone 136, and the classification component 122 can determine or infer that the object 106 is closer to the location of the microphone 132 than the location of the microphone 136, and accordingly, the object 106 can be closer to the other portion of the touch sensitive surface 104 that is in proximity to the microphone 132 than the portion of the touch sensitive surface 104 that is in proximity to the microphone 136.

As another example, based at least in part on the difference in intensity levels between the emitted audio signal 202 and the reflected audio signal 204 and other reflected audio signal 206, the classification component 122 can determine, infer, or estimate the distance between the object 106 and the touch sensitive surface 104. For instance, if the respective intensity levels of the reflected audio signal 204 and other reflected audio signal 206 are relatively low, as compared to the intensity level of the emitted audio signal 202, this can indicate that the object 106 is located relatively far away from the touch sensitive surface 104, and the classification component 122 can determine or infer that the object 106 is located relatively far away from the touch sensitive surface 104, and can determine or estimate the distance between the object 106 and touch sensitive surface 104 based at least in part on the differences in intensity levels between the emitted audio signal 202 and the reflected audio signal 204 and other reflected audio signal 206. Also, if the respective intensity levels of the reflected audio signal 204 and/or other reflected audio signal 206 are relatively high (e.g., relatively close to being as strong or as high as the intensity level of the emitted audio signal 202), as compared to the intensity level of the emitted audio signal 202, this can indicate that the object 106 is located relatively close to the touch sensitive surface 104, and the classification component 122 can determine or infer that the object 106 is located relatively close to the touch sensitive surface 104, and can determine or estimate the distance between the object 106 and touch sensitive surface 104 based at least in part on the differences in intensity levels between the emitted audio signal 202 and the reflected audio signal 204 and other reflected audio signal 206.

It is noted that, while the intensity level of the reflected audio signal 206 can be indicative of the location of the object 106 in relation to the touch sensitive surface 104 and indicative of the distance of the object 106 from the touch display screen 104, one or more other factors can impact the intensity level, and the classification component 122 can take these factors into account during the analysis of the reflected audio signal 204, the other reflected audio signal 206, and/or the emitted audio signal 202. For instance, often with regard to an intensity level of a reflected audio signal, as the distance between the object and the sensor (e.g., microphone) (and associated touch sensitive surface) decreases, the intensity of the reflected audio signal can increase, and conversely, as the distance between the object and the sensor (and associated touch sensitive surface) increases, the intensity of the reflected audio signal can decrease. However, due to other factors, such as, for example, interference or other effects that can impact the reflected audio signal, including its intensity level, there can be circumstances where the change in intensity level in relation to distance of the object from the touch sensitive surface may not be uniform and/or circumstances where the intensity level of the reflected audio signal can be lower when the object is closer to the touch sensitive surface and higher when the object is farther away from the touch sensitive surface. The classification component 122 can take these other factors into account when determining the location of the object 106 in relation to the touch sensitive surface 104 and determining the distance of the object 106 from the touch display screen 104. For example, the classification component 122 can perform analysis on other sensor data (e.g., accelerometer data, gyroscope data, IMU data, and/or vibro-acoustic data, . . . ) to facilitate determining the location of the object 106 in relation to the touch sensitive surface 104, determining the distance of the object 106 from the touch sensitive surface 104, and/or verifying whether the results of the analysis of the ultrasound data (e.g., reflected audio signal(s) and/or emitted audio signal) with regard to the location and/or distance of the object 106 with respect to the touch sensitive surface 104 are desirably accurate. As another example, the classification component 122 can be trained (e.g., using machine learning techniques and algorithms) to take such other factors (e.g., interference or other effects) into account when determining the location of the object 106 in relation to the touch sensitive surface 104 and/or determining the distance of the object 106 from the touch sensitive surface 104 based at least in part on the reflected audio signal 204, the other reflected audio signal 206, and/or the emitted audio signal 202.

As still another example, based at least in part on the difference in a first time of arrival of the reflected audio signal 204 to the microphone 136 and a second time of arrival of the other reflected audio signal 206 to the microphone 132, the classification component 122 can classify a hover or touch (or impending touch) interaction of the object 106 with the touch sensitive surface 104, including determining or classifying the type of object that the object 106 is, determine a distance (e.g., the proximity) between the object 106 and the touch sensitive surface 104, and/or determine the location on the touch sensitive surface 104 (and/or button or control associated with the touch sensitive surface 104 and associated display screen) that the object 106 is hovering over or is expected to touch.

For instance, if the first time of arrival of the reflected audio signal 204 at the microphone 136 occurs before the second time of arrival of the other reflected audio signal 206 at the microphone 132, this can indicate that the object 106 is closer to the location of the microphone 136 than the location of the microphone 132, and the classification component 122 can determine or infer that the object 106 is closer to the location of the microphone 136 than the location of the microphone 132, and accordingly, the object 106 can be closer to a portion of the touch sensitive surface 104 that is in proximity to the microphone 136 than another portion of the touch sensitive surface 104 that is in proximity to the microphone 132. Conversely, if the first time of arrival of the reflected audio signal 204 at the microphone 136 occurs after the second time of arrival of the other reflected audio signal 206 at the microphone 132, this can indicate that the object 106 is closer to the location of the microphone 132 than the location of the microphone 136, and the classification component 122 can determine or infer that the object 106 is closer to the location of the microphone 132 than the location of the microphone 136, and accordingly, the object 106 can be closer to the other portion of the touch sensitive surface 104 that is in proximity to the microphone 132 than the portion of the touch sensitive surface 104 that is in proximity to the microphone 136.

In some embodiments, the device 100, employing the classification component 122, can fuse the use of multiple (e.g., two or more) object sensing technologies (e.g., ultrasound technology, touch sensor technology, accelerometer technology, gyroscope technology, and/or IMU technology) to enhance the detection of objects 106, identification of objects 106, and classifications of touch or hover interactions of objects 106 with the touch sensitive surface 104. For instance, the classification component 122 can receive ultrasound data from the ultrasound component 114, touch surface data from the surface-related sensors 112, accelerometer data from the accelerometer component 116, gyroscope data from the gyroscope component 118, and/or IMU data from the IMU 120. The classification component 122, employing one or more classification engines, can analyze the ultrasound data, touch surface data, accelerometer data, gyroscope data, and/or IMU data. Based at least in part on such analysis, the classification component 122 can extract respective characteristic information (e.g., information regarding or indicating characteristics, features, and/or structures) relating to the touch or hover interaction from the respective types of sensor data (e.g., ultrasound data, touch surface data, accelerometer data, gyroscope data, and/or IMU data). For instance, the classification component 122 can analyze each type of sensor data and, for each type of sensor data, can extract characteristic information relating to the touch or hover interaction from that particular sensor data. In other embodiments, based at least in part on the analysis, the classification component 122 can extract characteristic information relating to the touch or hover interaction from the sensor data as a whole (e.g., a combined analysis of, and extraction of characteristic information from, the sensor data as a whole). The characteristic information can comprise, for example, features, shapes, dimensions, spectral centroid, spectral density, spherical harmonics, total average spectral energy, log spectral band ratios, and/or other features related to the contact or hovering of the object 106 with the touch sensitive surface 104, with respect to the time domain or frequency domain, respectively.

The classification component 122 can utilize (e.g., analyze) the characteristic information to discriminate or distinguish between different types of touch or hover interactions (e.g., unintentional touch or hover interaction, or intentional touch interaction) of objects 106 (e.g., finger(s), ear or face, palm, or other body part, of the user; a stylus; or another type of object) with the touch sensitive surface 104. In certain embodiments, the classification component 122 can generate a representational image (e.g., frame image) of (e.g., corresponding to) the respective characteristic information relating to a touch or hover interaction of an object 106 with the touch sensitive surface 104 based at least in part on (e.g., from) the respective characteristic information extracted from the ultrasound data, touch surface data, and/or other sensor data. The representational image can be or comprise a pattern relating to (e.g., representing or corresponding to) the touch or hover interaction of the object 106 with the touch sensitive surface 104.

The classification component 122 can analyze the representational image to facilitate classifying the touch or hover interaction of the object 106 with the touch sensitive surface 104, in accordance with the defined classification criteria. In some embodiments, the classification component 122 can evaluate or compare the characteristics (e.g., features) of the representational image to respective known characteristics that respectively can indicate whether the touch or hover interaction is intentional or unintentional and/or whether the object 106 is a finger(s) of the user, an ear of the user, a face of the user, a palm of the user, a stylus, or other object, and/or can provide one or more other indications that can facilitate classifying the touch or hover interaction. For instance, as part of the analysis, the classification component 122, employing one or more classification engines (e.g., one or more trained classification engines), can perform pattern analysis to compare the pattern(s) of the representational image relating to the touch or hover interaction of the object 106 with the touch sensitive surface 104 to known patterns for touch or hover interactions, such as, for example, known patterns for various types of intentional touch interactions and known patterns for various types of unintentional touch or hover interactions. Based at least in part on the results of such pattern analysis, the classification component 122 can determine whether the touch or hover interaction is an intentional touch interaction or an unintentional touch or hover interaction and/or the particular type of touch or hover interaction (e.g., intentional finger touch, unintentional finger touch, unintentional ear touch, or unintentional palm touch, . . . ).

In accordance with various embodiments, the classification component 122 can comprise one or more classification engines that can analyze sensor data and determine classifications of touch or hover interactions, such as described herein. For example, the classification component 122 can comprise a first classification engine that can analyze one or more types of sensor data (e.g., touch surface data, ultrasound data, accelerometer data, and/or other sensor data) relating to a touch or hover interaction (or another touch or hover interaction) and determine a first classification of the touch or hover interaction based at least in part on the results of analyzing such sensor data; a second classification engine that can analyze one or more other types of sensor data (e.g., gyroscope data, and/or other sensor data) relating to a touch or hover interaction and determine a second classification of the touch or hover interaction (or a classification of another touch or hover interaction) based at least in part on the results of analyzing such other types of sensor data; and/or a third classification engine that can analyze one or more other types of sensor data (e.g., vibro-acoustic data, and/or other sensor data) relating to the touch or hover interaction (or another touch or hover interaction) and determine a third classification of the touch or hover interaction (or a classification of the other touch or hover interaction) based at least in part on the results of analyzing such other sensor data. One of the classification engines of the classification component 122 can receive the respective classifications of a touch or hover interaction from respective classification engines, can analyze the respective classifications, and can determine the classification of the touch or hover interaction based at least in part on the result of analyzing the respective classifications, in accordance with the defined classification criteria. The use of multiple classification engines to classify touch or hover interactions can enhance (e.g., improve) the accuracy of classifying touch or hover interactions of objects 106 in contact or association (e.g., hovering) with the touch sensitive surface 104. In certain embodiments, the respective classification engines can operate in parallel (e.g., simultaneously) to process (e.g., analyze) respective types of sensor data to determine respective classifications of a touch or hover interaction.

With further regard to the operations management component 124 of the device 100, the operations management component 124 can be associated with (e.g., communicatively connected to) the classification component 122, the touch sensing component 102, the sensor component 110, the display screen of the display component 108, and/or other components of the device 100. As more fully described herein, the operations management component 124 can control functions associated with the touch sensitive surface 104, the display screen, processors (e.g., application processor), and/or other components of the device 100 based at least in part on (e.g., in response to) the classification(s) of a touch or hover interaction(s) of the object(s) 106 with the device 100, wherein the functions can comprise, for example, enabling a touch sensitive function of the touch sensitive surface 104 and associated display screen and/or another function of the device 100, disabling the touch sensitive function of the touch sensitive surface 104 and associated display screen and/or another function of the device 100, switching (e.g., transitioning) the touch sensitive surface 104 to an unlocked state (or maintaining the touch sensitive surface 104 in the unlocked state), switching the touch sensitive surface 104 to a locked state (or maintaining the touch sensitive surface 104 in the locked state), switching the display screen (e.g., touch display screen) of the device 100 to an on state (or maintaining the display screen in the on state), and/or switching the display screen to an off state (or maintaining the display screen in the off state), process and/or allow an intentional touch interaction, enable an operation(s) associated with the intentional touch interaction to be performed by the device 100 (e.g., by the touch display screen, a control, a button, and/or an application associated with the device 100, . . . ), reject an unintentional touch or hover interaction, and/or prevent an undesired operation(s) associated with the unintentional touch or hover interaction from being performed by the device 100 (e.g., by the touch display screen, control, button, and/or application, . . . ).

For example, in response to a determination that a touch interaction associated with the touch sensitive surface 104 is an unintentional touch interaction, the operations management component 124 can disable a touch sensitive function of the touch sensitive surface 104 to facilitate rejecting the unintentional touch or hover interaction such that the unintentional touching of the touch sensitive surface 104 is not able to engage or select a touch sensitive function of the touch sensitive surface 104 (e.g., prevents selection of a button or control associated with the touch sensitive surface 104 as presented on the display screen) and/or can control operation of the display screen (e.g., touch display screen) to have the display screen transition to or remain in an off state (e.g., a dark display screen). As another example, in response to a determination that a touch interaction associated with the touch sensitive surface 104 is an intentional touch interaction (e.g., intentional touch event), the operations management component 124 can enable a touch sensitive function(s) of the touch sensitive surface 104 to allow the finger(s) of the user to engage or select the touch sensitive function(s) of the touch sensitive surface 104 (e.g., enables selection of a button or control associated with the touch sensitive surface 104 as presented on the display screen) and/or can control operation of the display screen to have the display screen transition to or remain in an on state (e.g., a lit display screen).

As still another example, in response to a determination that a first touch or hover interaction associated with the touch sensitive surface 104 is an unintentional touch or hover interaction and a second touch interaction associated with the touch sensitive surface 104 is an intentional touch interaction (e.g., for simultaneous or substantially simultaneous touch or hover interactions), the operations management component 124 can reject the first touch or hover interaction as an unintentional touch or hover interaction, and can allow and process the second touch interaction as an intentional touch interaction, by respectively controlling operations of the touch sensitive surface 104, display screen, and/or other components of the device 100, as described herein. For example, the operations management component 124 can control operations of the touch sensitive device 100 to prevent certain operations associated with the unintentional touch or hover interaction from being performed by the device 100 and allow and facilitating performance of other operations associated with the intentional touch interaction by the device 100.

The device 100, by employing the classification component 122 and the ultrasound component 114, and/or by fusing the use of multiple (e.g., two or more) object sensing technologies (e.g., ultrasound technology, touch sensor technology, accelerometer technology, gyroscope technology, and/or IMU technology), can enhance the detection of objects 106, identification of objects 106, and classifications of touch or hover interactions of objects 106 with the touch sensitive surface 104. Also, the device 100, by employing the classification component 122 and the ultrasound component 114, and/or by fusing the use of multiple (e.g., two or more) object sensing technologies, can replace the functionality of an infrared proximity sensor for sensing objects in proximity to the touch sensitive surface. That is, the device 100 can provide enhanced functionality relating to detecting objects 106 in proximity to the touch sensitive surface 104 and classification of touch or hover interactions of objects 106 with the touch sensitive surface 104 without having to have or use an infrared proximity sensor. As a result, the space on the device 100 (e.g., space on or associated with the face or display screen of the device 100) that would otherwise have been taken up by the infrared proximity sensor can be utilized for other desired purposes, such as, for example, to enhance the screen size of the display screen of the device 100 (e.g., enhance or increase the ratio of the screen size of the display screen relative to the size of the touch sensitive device 100). Also, the resources of the device 100 that otherwise would have been used for the infrared proximity sensor can be used for other desired purposes.

The disclosed subject matter, in addition to rejecting undesired (e.g., unintentional) touch or hover interactions, preventing undesired operations from being performed by the device 100 in response to undesired touch or hover interactions, and obviating having to use an infrared proximity sensor, the device 100, by employing the classification component 122, the ultrasound component 114, operations management component 124, and other components of the device 100, can reduce or minimize the undesired use of resources of the device 100, including the undesired consumption of power of the battery (not shown) of the device 100 and the undesired use of processing and other operation-performing resources of the device 100. As a result, in the short term, the disclosed subject matter can conserve battery power and improve (e.g., increase or maintain) available battery power on the device 100 and can enable processing resources and other resources of the device 100 to be available for other desired uses, as compared to conventional devices (e.g., conventional devices with touch display screens or touch pads), since the resources are not being undesirably diverted to perform undesired operations in response to undesired touch or hover interactions. In the long term, the disclosed subject matter can improve or extend the battery life of the battery of the device 100, as compared to conventional devices.

Figure 3:
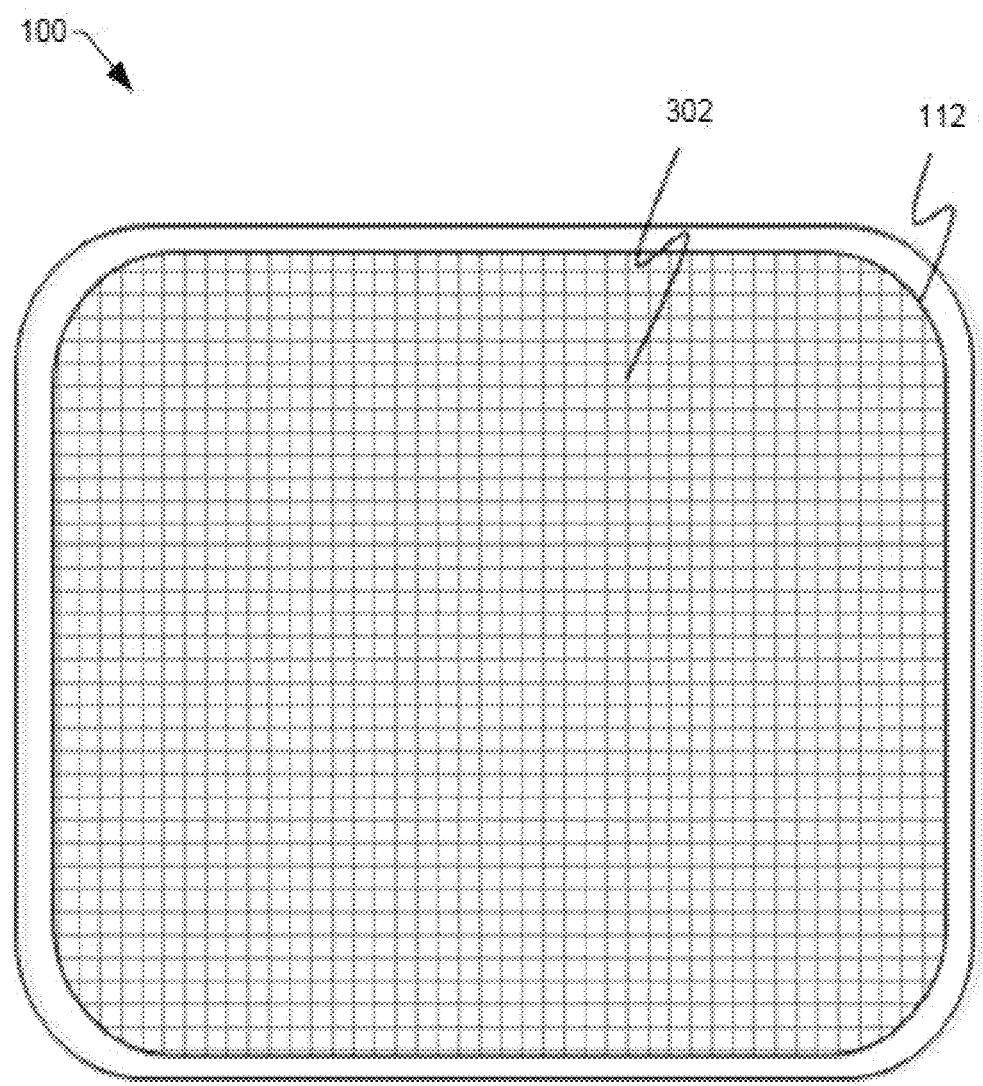
FIG. 3 depicts a diagram of a top view of the example touch sensitive device of FIGS. 2A and 2B, including an illustrative view of surface-related sensors in accordance with a specific embodiment of the present invention.

With further regard to the touch sensitive surface 104, referring to FIG. 3 (along with FIGS. 2A and 2B), FIG. 3 depicts a diagram of a top view of the example touch sensitive device 100, including the touch sensitive surface 104, and an illustrative view of surface-related sensors 112 in the form of a grid, in accordance with various aspects and embodiments of the disclosed subject matter. The touch sensitive surface 104 can comprise or be associated with the surface-related sensors 112. In some embodiments, the surface-related sensors 112 can be distributed in various locations associated with the touch sensitive surface 104 to form a sensor array 302, wherein respective surface-related sensors 112 can be associated with respective portions of the touch sensitive surface 104. For example, the surface-related sensors 112 can be distributed to in various locations associated with the touch sensitive surface 104 to form a grid (e.g., an x, y grid). It is to be appreciated and understood that such a grid formation is merely one example formation that can be employed for distributing the surface-related sensors 112 of the sensor array 302 at various locations associated with the touch sensitive surface 104, and, in accordance with other embodiments of the disclosed subject matter, the surface-related sensors 112 can be distributed in other formations (e.g., uniform or non-uniform formations) with respect to the touch sensitive surface 104.

In some embodiments, when an object(s) 106 is brought into contact with, or is in sufficiently close proximity to, a location(s) on the touch sensitive surface 104, one or more surface-related sensors 112 of the sensor array 302 that are associated with that location on the touch sensitive surface 104 can sense such contact of the object(s) 106 with the that location(s) on the touch sensitive surface 104 or sense such proximity of the object(s) 106 to that location(s) on the touch sensitive surface 104. In other embodiments, the surface-related sensors 112 of the sensor array 302 can be configured to sense contact of an object(s) 106 with the touch sensitive surface 104, with other sensors being employed to sense hovering of the object(s) 106 in proximity to the touch sensitive surface 104. In response to the one or more surface-related sensors 112 sensing or detecting the object(s) 106 in contact with or in proximity to that location(s) on the touch sensitive surface 104, the one or more surface-related sensors 112 can generate signals (e.g., sensor data) and can communicate the signals to the classification component 122 for analysis and evaluation (e.g., to facilitate determining which of the surface-related sensors 112 is in contact with the object(s) 106 or in proximity to the object(s) 106).

In some implementations, the touch sensing component 102 or the classification component 122 can sweep the surface-related sensors 112 of the sensor array 302 or can otherwise poll the surface-related sensors 112 of the sensor array 302 to facilitate obtaining respective sensor data (e.g., respective touch surface data) from respective surface-related sensors 112 of the sensor array 302, to facilitate enabling the classification component 122 to determine which portion(s) of the touch sensitive surface 104 is in contact with or in proximity to the object(s) 106 at a given time (e.g., a given moment or period of time). For example, the touch sensing component 102 or the classification component 122 can sweep the surface-related sensors 112 of the sensor array 302 or can otherwise poll the surface-related sensors 112 of the sensor array 302 every ¹/₁₅th of a second, ¹/₃₀th of a second, every ¹/₆₀th of a second, every ¹/₁₀₀th of a second, or at another desired rate or periodicity. The classification component 122 (or touch sensing component 102) can process and/or organize (e.g., arrange) the sensor data obtained from the surface-related sensors 112 of the sensor array 302 to generate frame data in the form of x, y dimensional data that can represent (e.g., correspond to) respective touch (or hover) interactions of an object(s) 106 with respective surface-related sensors 112 at the given time, wherein respective frame data associated with the respective surface-related sensors 112 can be or can comprise the respective sensor data of the respective surface-related sensors 112 or the respective frame data can be determined based at least in part on the respective sensor data.

With further regard to other sensors (e.g., ultrasound component 114, accelerometer component 116, gyroscope component 118, and/or IMU 120) of the sensor component 110, in some embodiments, the other sensors of the sensor component 110 can comprise one or more motion-related sensors that can be employed to detect movement of an object 106 in relation to the touch sensitive surface 104, motion of the device 100 about or along one or more axes (e.g., x-axis, y-axis, and/or z-axis), and/or other motion-related characteristics of the object 106 or device 100, as well as orientation of the device 100, and can generate sensor data (e.g., ultrasound data, accelerometer data, or other motion-related sensor data) that can correspond to the movement of the object 106, motion of the device 100, other motion-related characteristics of the object 106 or device 100, and/or orientation of the device 100, detected by the one or more motion-related sensors. For example, a multi-axis (e.g., two or three axis) motion-related sensor can generate first motion data relating to motion of the touch sensitive device along a first axis (e.g., x-axis), second motion data relating to motion of the touch sensitive device along a second axis (e.g., y-axis), and/or third motion data relating to motion of the touch sensitive device along a third axis (e.g., z-axis).

A motion-related sensor, such as an accelerometer, gyroscope, IMU, and/or other type of motion-related sensor, can be a single-axis motion-related sensor or a multiple-axis (e.g., two-axis or three-axis) motion related sensor. The one or more motion-related sensors can monitor and sense motion of the device 100 at a desired sensing rate (e.g., a second or sub-second rate). For example, a motion-related sensor can monitor and sense movement of the object 106, motion of the device 100 along one or more axes, other motion-related characteristics of the object 106 or device 100, and/or orientation of the device 100 every $\frac{1}{15}$th of a second, $\frac{1}{30}$th of a second, every $\frac{1}{60}$th of a second, every $\frac{1}{100}$th of a second, or at another desired sensing rate. In certain embodiments, the motion-related sensors can include one or more vibro-acoustic sensors that can detect and/or measure movement or vibrations of the device 100. The one or more vibro-acoustic sensors can generate motion data, comprising vibro-acoustic data, based at least in part on the detected or measured movement or vibrations of the device 100, and can provide such motion data to the classification component 122 for analysis.

In some embodiments, as motion data is generated by the motion-related sensors, that motion data can be stored in a buffer component 138 (buffer comp. 138) (e.g., buffer memory) for a desired amount of time. For instance, the buffer component 138 can store motion data (and/or touch surface data) that can cover a defined period of time (e.g., the last second, the last two seconds, the last three seconds, or another desired period of time). As an example, in response to determining that the device 100 is in an in-call state or an active state (e.g., the touch sensitive surface 104 is in an active state), the classification component 122 (or another component, such as a processor, of the device 100) can have the buffer component 138 store the motion data, the touch surface data (e.g., obtained from the surface-related sensors 112), or other desired data (e.g., orientation data) to facilitate analysis of such data by the classification component 122.

As described herein, in some embodiments, as part of the analysis of the touch surface data, ultrasound data, or other sensor data, the classification component 122 can identify and extract characteristic information (e.g., features, shapes, dimensions, spectral centroid, and/or spectral density, . . . ) related to contact or association (e.g., hovering) of an object(s) 106 with the touch sensitive surface 104 from the touch surface data, ultrasound data, or other sensor data. The classification component 122 can utilize the characteristic information (e.g., extracted features) to generate a frame image, comprising frame data, of the contact or association of the object(s) 106 with the touch sensitive surface 104. In other embodiments, the classification component 122 can analyze the touch surface data without extracting characteristic information relating to contact or association (e.g., hovering) of the object(s) 106 with the touch sensitive surface 104 from the touch surface data, ultrasound data, or other sensor data.

Figure 4:
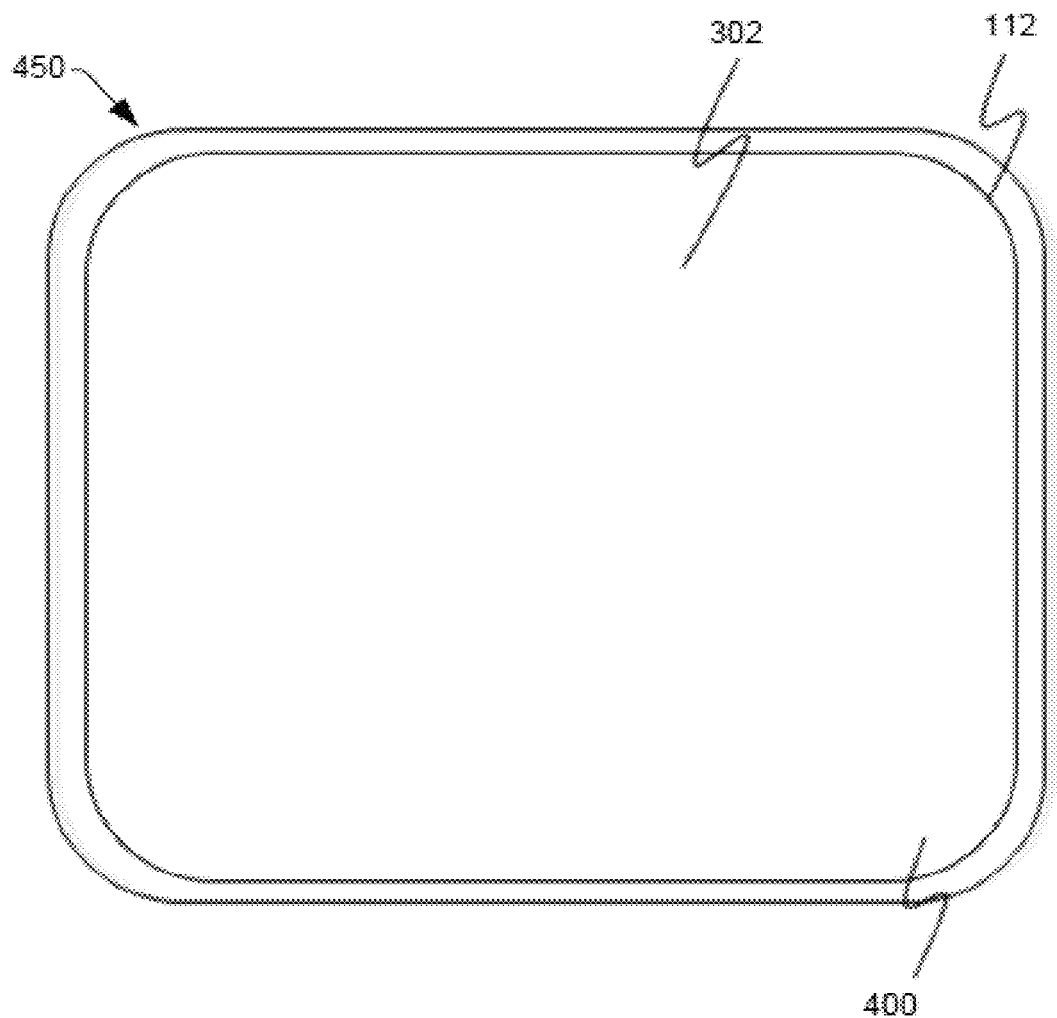
FIG. 4 presents a diagram of an example frame image as part of a visual representation of a top view of an example touch sensitive device, the frame image in accordance with a specific embodiment of the present invention.

Frame data can be conceptually understood as providing an image or frame image that can have higher-density portions representing areas of the touch sensitive surface 104 that are in contact with (or in proximity to) an object(s) 106 and other lower-density portions representing areas of the touch sensitive surface 104 that are not in contact with (or in proximity to) an object(s). Turning briefly to FIG. 4 (along with FIGS. 2A, 2B, and 3), FIG. 4 presents a diagram of an example frame image 400 as part of a visual representation 450 of a top view of an example touch sensitive device 100, the frame image 400 comprising or representing frame data associated with the touch sensitive surface 104, in accordance with various aspects and embodiments of the disclosed subject matter. With respect to the example frame image 400, the surface-related sensors 112 of the sensor array 302 have not detected an object 106 in contact with or in proximity to the surface-related sensors 112 and have correspondingly generated signals (e.g., sensor data) indicating that no object has been detected in contact with or in proximity to the surface-related sensors 112. In this example frame image 400, as no objects are detected in contact with or in proximity to the touch sensitive surface 104, the frame image 400 can have the appearance illustrated in FIG. 4 with no higher-density portions (e.g., no darker colored regions) being shown in the frame image 400.

However, when objects (e.g., object 106) are brought into contact with or in proximity to the touch sensitive surface 104, a portion of the surface-related sensors 112 of the sensor array 302 that are located in the portion(s) of the touch sensitive surface 104 that is in contact with or proximity to the objects can detect such objects, and can generate sensor data representing such detection in response. The portion of the surface-related sensors 112 can communicate the sensor data to report that the objects are in contact with or proximity to the portion(s) of the touch sensitive surface 104 associated with the portion of the surface-related sensors 112, and a contrast pattern can emerge in a frame image representative of such a state of contact.

Figure 5:
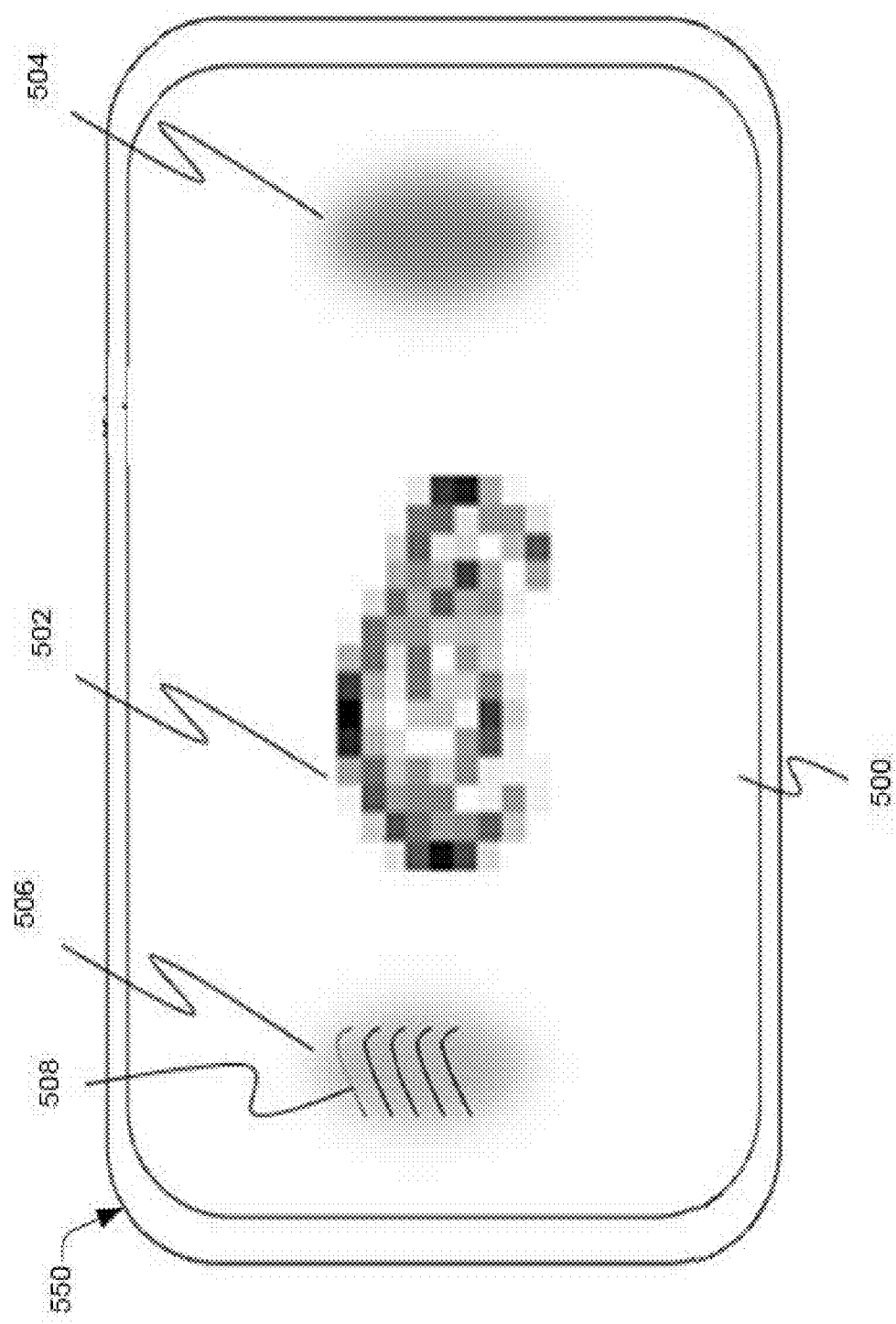
FIG. 5 illustrates a diagram of an example frame image as part of a visual representation of a top view of the touch sensitive device, with a user having the device near the user's ear, in accordance with one embodiment of the present invention.
Figure 6:
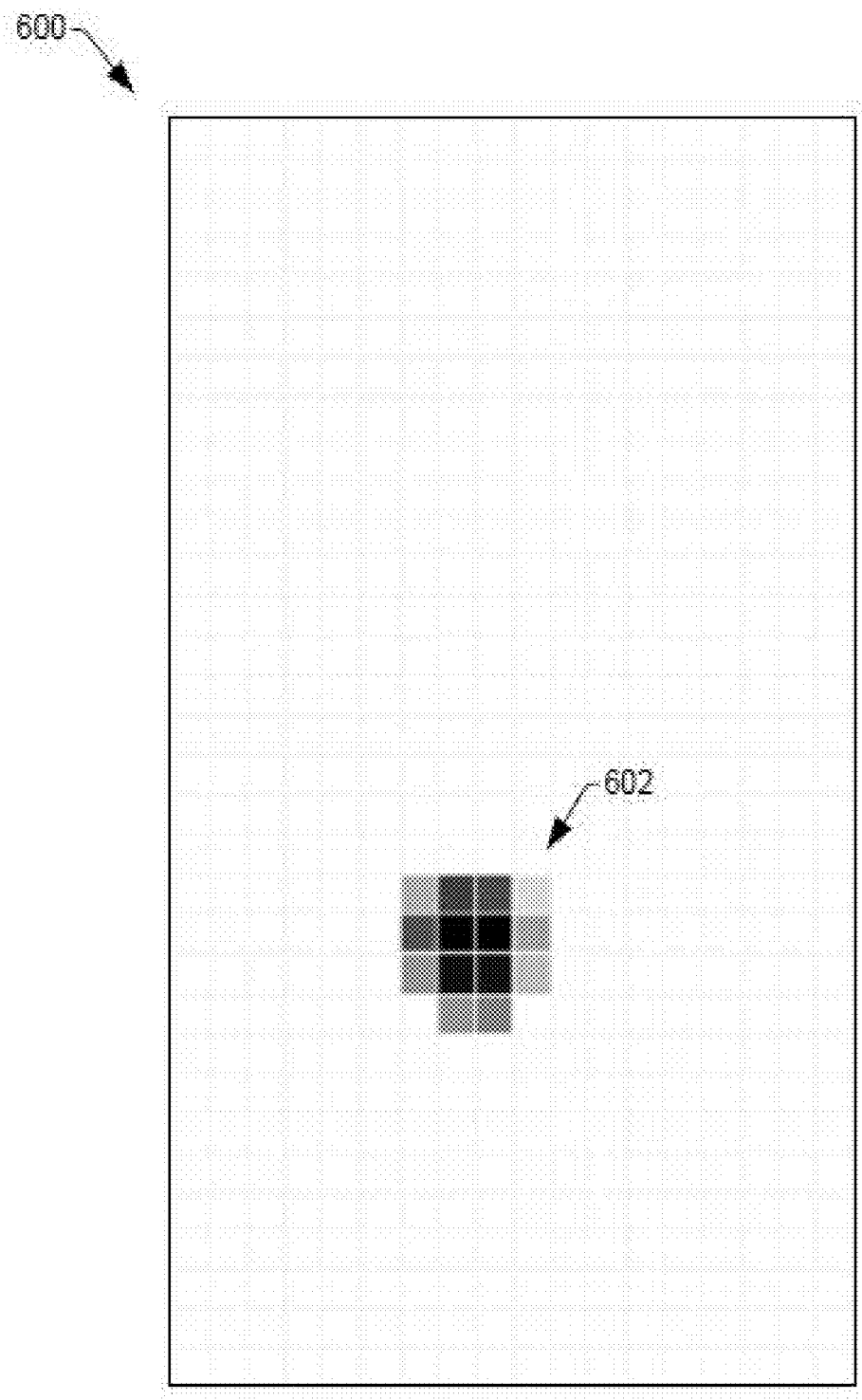
FIG. 6 illustrates a diagram of an example frame image that can be generated based on a finger of the user contacting a center portion of the touch sensitive surface in accordance with one embodiment of the present invention.

With regard to FIGS. 5 and 6, the classification component 122 can receive the sensor data (e.g., touch surface data) from the certain surface-related sensors 112. The touch sensitive surface 104 can comprise or be associated with a sensor array 302 that can include the surface-related sensors 112, which can comprise certain surface-related sensors 112, such as, for example, capacitive sensors, that can sense capacitance levels associated with the touch sensitive surface 104. In other embodiments, the surface-related sensors 112 can comprises optical or resistive sensors that can sensor optical levels or resistance levels. The certain surface-related sensors 112 (and/or other sensors (e.g., sensors of the ultrasound component 114) can sense no contact, relative states of intensity of contact with the touch sensitive surface 104, and/or relative proximity of an object 106 (e.g., finger(s), ear, or face of the user) to the touch sensitive surface 104 without touching the touch sensitive surface. For instance, in some implementations, the sensor array 302 of surface-related sensors 112 can be capable of detecting or determining a level of intensity of contact of an object 106 with the touch sensitive surface 104, wherein the level of intensity of contact can relate to, for example an amount of pressure applied by an object 106 on the touch sensitive surface 104, an intensity of a resistance experienced at the point of contact of the object with the touch sensitive surface 104, an intensity of a capacitance experienced at the point of contact of the object 106 with the touch sensitive surface 104, and/or another type(s) of intensity relating to contact of an object 106 with one or more surface-related sensors 112 of the sensor array 302. As a result of the sensing, the certain surface-related sensors 112 (and/or other sensors) can generate sensor data, such as capacitance data (e.g., mutual capacitance data), that can correspond to the respective amounts of capacitance associated with respective portions of the touch sensitive surface 104 and can indicate respective levels of contact (e.g., no contact or respective states of intensity of contact) of an object 106 (e.g., finger(s), ear, or face of the user) with the touch sensitive surface 104 or respective proximity of the object 106, or portion thereof, to the touch sensitive surface 104.

In some embodiments, the touch sensitive device 100 also can comprise other sensors of the sensor component 110, wherein the other sensors can include, for example, an ultrasound component 114, an accelerometer component 116, a gyroscope component 118, an IMU 120, and/or another type of sensor. The classification component 122 can receive other sensor data, such as, for example, ultrasound data from the ultrasound component 114, accelerometer data from the accelerometer component 116, gyroscope data from the gyroscope component 118, IMU data from the IMU 120, and/or other types of sensor data from one or more other types of sensors.

Based at least in part on the results of analyzing the respective sensor data (e.g., mutual capacitance data) from respective surface-related sensors of the certain surface-related sensors 112 and/or the other sensor data, the classification component 122 can generate a frame image comprising one or more grayscale colored regions that can present grayscale information (e.g., corresponding to respective higher-density portions of the frame image) illustrating respective intensities of contact of an object(s) 106 (e.g., finger(s), face, ear, palm, or stylus, . . . ) of or associated with the user with the respective portions of the touch sensitive surface 104 and/or respective proximities of respective portions of the object(s) 106 to the touch sensitive surface 104.

The classification component 122 can determine or identify that the type of touch or hover interaction(s) of the object(s) 106 with the touch sensitive surface 104 and can further determine that whether the touch or hover interaction(s) is an intentional touch interaction or an unintentional touch or hover interaction, based at least in part on the results of analyzing the sensor data and/or other sensor data (e.g., raw sensor data and/or other raw sensor data) and/or analyzing the frame image generated from the sensor data and/or the other sensor data. Based at least in part on the classification of the touch interaction(s) being an intentional touch interaction or the classification of the interaction(s) being an unintentional touch or hover interaction, and/or the type of touch or hover interaction(s) on the touch sensitive surface 104, accordingly, the operations management component 124 can control the operation of the touch sensitive device 100 to perform an operation (e.g., selection of a button, control, or application, . . . ) that can correspond to the touching of the touch sensitive surface 104, in response to determining that a touch interaction is an intentional touch interaction, or to reject the touch or hover interaction(s) and not perform a particular operation and/or disable the touch sensitive surface 104 and/or turn off the touch sensitive surface 104 or associated display screen of the device 100, in response to determining that a particular touch or hover interaction is an unintentional touch or hover interaction.

With further regard to FIG. 5 (along with FIGS. 1, 2, and 3), FIG. 5 illustrates a diagram of an example frame image 500 as part of a visual representation 550 of a top view of the touch sensitive device 100, wherein the example frame image 500 can comprise or represent frame data that can be determined during a time period when sensor data for a frame is acquired by the touch sensing component 102 and associated sensor component 110 in connection with a user having the device 100 near the user's ear, in accordance with various aspects and embodiments of the disclosed subject matter. During the time period, the surface-related sensors 112 can respectively sense no contact by an object, relative states of intensity of contact of an object (e.g., finger(s), ear, face, or palm of the user hovering with respect) with the touch sensitive surface 104, and/or relative proximity of the object to the touch sensitive surface 104 without touching the touch sensitive surface, and, accordingly, can generate sensor data (e.g., capacitance data) based at least in part on the respective sensing of the respective surface-related sensors 112. The sensor data (e.g., capacitance data) can correspond to the respective touch-related levels (e.g., respective amounts of capacitance) associated with respective portions of the touch sensitive surface 104 and can indicate respective levels of contact (e.g., no contact or respective states of intensity of contact) of an object(s) with the touch sensitive surface 104 or respective proximity of the object, or portion thereof, to the touch sensitive surface 104.

The classification component 122 (e.g., classification engine(s)) can receive the sensor data from the surface-related sensors 112. In some embodiments and under certain circumstances (as more fully described herein), the classification engine also can receive other sensor data (e.g., ultrasound data, accelerometer data, gyroscope data, and/or IMU data) from other sensors (e.g., ultrasound component 114, accelerometer component 116, gyroscope component 118, IMU 120, and/or another type of sensor) of the sensor component 110. Based at least in part on the results of analyzing the respective sensor data from respective surface-related sensors of the surface-related sensors 112 and/or the other sensor data from the other sensors, the classification component 122 can generate the frame image 500 that can comprise interaction pattern 502 (e.g., a particular grayscale colored region), interaction pattern 504, and interaction pattern 506. With regard to the frame image 500 of FIG. 5, an ear interaction of an ear of the user with the touch sensitive surface 104 can yield the interaction pattern 502, a cheek interaction of the cheek of the user with the touch sensitive surface 104 can provide the relatively uniform interaction pattern 504, which can have an ovular shape and can correspond to the cheek interaction, and a hair or head interaction of the hair or head of the user can yield the interaction pattern 506, which can have some uniformity, but potentially can be influenced by the presence of elongated striations 508 due to contact of the hair of the user with the touch sensitive surface 104.

The classification component 122 can determine or identify that the touch or hover interactions comprise the ear interaction, the cheek interaction, and the hair or head interaction of the user with respective regions of the touch sensitive surface 104 and can further determine (e.g., classify) that such touch or hover interactions are unintentional touch or hover interactions, based at least in part on the results of analyzing the sensor data (e.g., touch surface data) and/or the other sensor data (e.g., ultrasound data, accelerometer data, gyroscope data, and/or IMU data), and/or the results of analyzing the frame image 500 generated from the sensor data and/or the other sensor data, and the training of the classification component 122 (e.g., classification engine of the classification component 122), in accordance with the defined classification criteria. It will be appreciated that each of interaction patterns 502, 504, and 506 can provide a signature that viewed collectively or individually can be capable of being classified (e.g., by the classification component 122) or that can be capable of being used (e.g., by the classification component 122) to corroborate a classification of the hover or touch interaction(s) with the touch sensitive surface 104.

It also is to be appreciated and understood that there can be many different variations of this. For example, a user may wear glasses that wrap around the rear of the ear and therefore are supported by the ear in ways that potentially can adjust the contact pattern sensed by the sensors (e.g., surface-related sensors 112, and/or ultrasound component 114, ... ) of or associated with the touch sensitive surface 104 when the touch sensitive device 100 (e.g., phone) is held up against an ear of the user. Similarly, the user may wear headgear that at least potentially can be sensed (e.g., by the surface-related sensors 112, and/or ultrasound component 114, ... ) or piercings and/or jewelry that can be sensed (e.g., by the surface-related sensors 112, and/or ultrasound component 114, ... ) and can create particular touch (e.g., contact) or hover patterns with the touch sensitive surface 104, wherein such touch or hover interactions can be, or at least potentially can be, particularly useful in determining (e.g., by the classification component 122) when a head of a user is held against the touch sensitive surface 104 of the touch sensitive device 100.

In response to the touch or hover interaction(s) being classified by the classification component 122 as unintentional, the operations management component 124 can receive a message regarding the unintentional touch or hover interaction(s) from the classification component 122 and can take appropriate action. For example, the operations management component 124 can reject the unintentional touch or hover interaction, prevent an operation from being performed by the device 100 in response to the unintentional touch or hover interaction, disable a touch-related function associated with the touch sensitive surface 104 and associated display screen of the display component 108, transition (or maintain) the display screen from an on state to (or in) an off state, transition (or maintain) the touch sensitive surface 104 from an unlock state to (or in) a locked state, and/or transition (or maintain) a component (e.g., a processor, such as an application processor) of the device 100 from an active state to (or in) an inactive state (e.g., sleep mode).

Referring briefly to FIG. 6 (along with FIGS. 2A, 2B, and 3), FIG. 6 illustrates a diagram of an example frame image 600 that can be generated based at least in part on sensor data when certain surface-related sensors 112 of the sensor array 302 detect contact (e.g., relative intensities of contact) of a finger of the user with a certain portion (e.g., center portion) of the touch sensitive surface 104, in accordance with various aspects and embodiments of the disclosed subject matter. The frame image 600 can represent a frame associated with the touch sensitive surface 104 at a time during which a finger of the user is in contact with a particular portion (e.g., center portion) of the touch sensitive surface 104. The respective certain surface-related sensors 112 and/or other sensors (e.g., ultrasound component 114, accelerometer component 116, gyroscope component 118, IMU 120, and/or another type of sensor) of the sensor component 110 can respectively sense no contact by an object with the touch sensitive surface 104, relative states of intensity of contact of an object (e.g., finger(s) of the user) with the touch sensitive surface 104, and/or relative proximity of the object to the touch sensitive surface 104 without touching the touch sensitive surface 104, and, accordingly, can generate sensor data (e.g., touch surface data, such as capacitance data, ultrasound data, accelerometer data, gyroscope data, and/or IMU data) based at least in part on the respective sensing of the respective surface-related sensors 112 and/or the other sensors of the sensor component 110.

The classification component 122 can receive the sensor data from the certain surface-related sensors 112 and/or the other sensor data from the other sensors of the sensor component 110. Based at least in part on the results of analyzing the respective sensor data from respective surface-related sensors of the certain surface-related sensors 112 and/or the other sensor data from the other sensors, the classification component 122 can generate the frame image 600 comprising the grayscale colored region 602 that can present grayscale information (e.g., corresponding to respective higher-density portions of the frame image 600) depicting respective intensities of contact of respective portions of the finger of the user with the respective portions of the touch sensitive surface 104 and/or respective proximities of respective portions of the finger of the user to the touch sensitive surface 104. For example, the grayscale colored region 602 can indicate that an object, which correspond to (e.g., be in the shape of) a finger (e.g., a tip, knuckle, or other portion of the finger), is in contact with the portion (e.g., a center or approximately center portion) of the touch sensitive surface 104 that can correspond to the location of the grayscale colored region 602 depicted in the frame image 600. The classification component 122 can determine or identify that the touch event is a finger touch of the user on such portion (e.g., center portion) of the touch sensitive surface 104 and can further determine that such finger touch is an intentional touch interaction (e.g., an intentional touch event), based at least in part on the results of analyzing the sensor data and/or other sensor data (e.g., raw sensor data and/or other raw sensor data) and/or analyzing the frame image 600 generated from the sensor data and/or the other sensor data.

Based at least in part on the classification of the touch interaction being an intentional touch interaction and being a finger touch of the portion (e.g., center or approximately center portion) of the touch sensitive surface 104 that can correspond to the location of the grayscale colored region 602, the operations management component 124 can control the operation of the touch sensitive device 100 to perform an operation (e.g., selection of a button, control, or application, ... ) that can correspond to such touching of the touch sensitive surface 104.

With further regard to FIG. 2A and classification of touch or hover interactions of objects 106 with the touch sensitive surface 104, in accordance with various embodiments, the classification component 122 can perform an initial classification of the touch or hover interaction of an object 106 with the touch sensitive surface 104, based at least in part on the results of an analysis of one or more types of sensor data (e.g., ultrasound data and/or touch surface data), in accordance with the defined classification criteria. As desired (e.g., when in accordance with the defined classification criteria), the classification component 122 also can perform additional analysis of other sensor data (e.g., ultrasound data, accelerometer data, gyroscope data, IMU data, and/or other type of sensor data) to facilitate verifying or confirming the initial classification of the touch or hover interaction (e.g., to make a final or updated classification of the touch or hover interaction).

For example, if the initial classification of the touch or hover interaction of an object 106 with the touch sensitive surface 104, based at least in part on the touch surface data, is an intentional finger touch of the touch sensitive surface 104 by the user, and if the analysis of the other sensor data indicates that there is an intentional finger touch of the touch sensitive surface 104 by the user, the classification component 122 can determine that the other sensor data analysis confirms the initial classification of the touch interaction, and can determine (e.g., make a final determination) that the classification associated with the touch interaction of the object 106 with the touch sensitive surface 104 is an intentional finger touch of the touch sensitive surface 104. If, however, the initial classification or the touch or hover interaction, based at least in part on the touch surface data, is that there is contact with the touch sensitive surface 104, and such contact is an unintentional touch of a palm and finger of the user with the touch sensitive surface 104, and if the analysis of the other sensor data indicates that a finger of the user is in contact with the touch sensitive surface 104 and such contact is an intentional touch of the finger of the user with the touch sensitive surface 104, the classification component 122 can determine that the other sensor data analysis does not confirm the initial classification determined using the touch surface data, and can determine that no classification of the touch or hover interaction can be determined based on such sensor data, and/or can determine that other types of sensor data are to be analyzed, and/or can determine that additional touch surface data and/or other sensor data are to be collected and analyzed, to facilitate determining a classification of the touch or hover interaction of the object 106 with the touch sensitive surface 104.

In other implementations, if the initial classification attempt of the touch or hover interaction of an object 106 with the touch sensitive surface 104, based at least in part on the touch surface data, was inconclusive or ambiguous, the analysis of the other sensor data (e.g., ultrasound data, accelerometer data, gyroscope data, IMU data, and/or other type of sensor data) by the classification component 122 can be used by the classification component 122 to facilitate determining a classification of the touch or hover interaction of the object 106 with the touch sensitive surface 104, in accordance with the defined classification criteria. In still other implementations, the classification component 122 can determine a classification of touch or hover interaction of an object 106 with the touch sensitive surface 104 based at least in part on the results of analyzing one or more types of sensor data (e.g., ultrasound data, and/or accelerometer data, . . . ), without having to analyze touch surface data or certain other types of sensor data, in accordance with the defined classification criteria.

In accordance with various embodiments, the device 100 also can comprise a processor component 140 (process. comp. 140) and a data store 142 that can be associated with (e.g., communicatively connected to) the other components (e.g., touch sensing component 102, touch sensitive surface 104, display component 108, sensor component 110, classification component 122, speakers 126, 128, and/or 130, microphones 132, 134, and/or 136, buffer component 138, . . . ) of the device 100. The processor component 140 can operate in conjunction with the other components of the device 100 to facilitate performing the various functions of the device 100. The processor component 140 can employ one or more processors, microprocessors, or controllers that can process data, such as information relating to ultrasound data, touch surface data, accelerometer data, gyroscope data, IMU data, impact or force data, vibro-acoustic data, orientation data, and/or other sensor data, classifications of touch or hover interactions, events or responsive actions (e.g., in response to touch or hover interactions), training information, machine learning information, resources, user data, applications, algorithms (e.g., classification algorithm(s), machine learning and/or training algorithm(s), . . . ), defined classification criteria, and/or other information, to facilitate operation of the device 100, as more fully disclosed herein, and control data flow between the device 100 and other components or devices of or associated with the device 100.

The data store 142 can store data structures (e.g., user data, metadata), code structure(s) (e.g., modules, objects, hashes, classes, procedures) or instructions, information relating to noise data, ultrasound data, touch surface data, accelerometer data, gyroscope data, IMU data, impact or force data, vibro-acoustic data, orientation data, and/or other sensor data, classifications of touch or hover interactions, events or responsive actions (e.g., in response to touch or hover interactions), training information, machine learning information, resources, user data, applications, algorithms (e.g., classification algorithm(s), machine learning and/or training algorithm(s), models, etc.), defined classification criteria, and/or other information, to facilitate controlling operations associated with the device 100. In some implementations, the processor component 140 can be functionally coupled (e.g., through a memory bus) to the data store 142 in order to store and retrieve information desired to operate and/or confer functionality, at least in part, to the touch sensing component 102, touch sensitive surface 104, display component 108, sensor component 110, classification component 122, speakers 126, 128, and/or 130, microphones 132, 134, and/or 136, buffer component 138, etc., and/or substantially any other operational aspects of the device 100.

Figure 7:
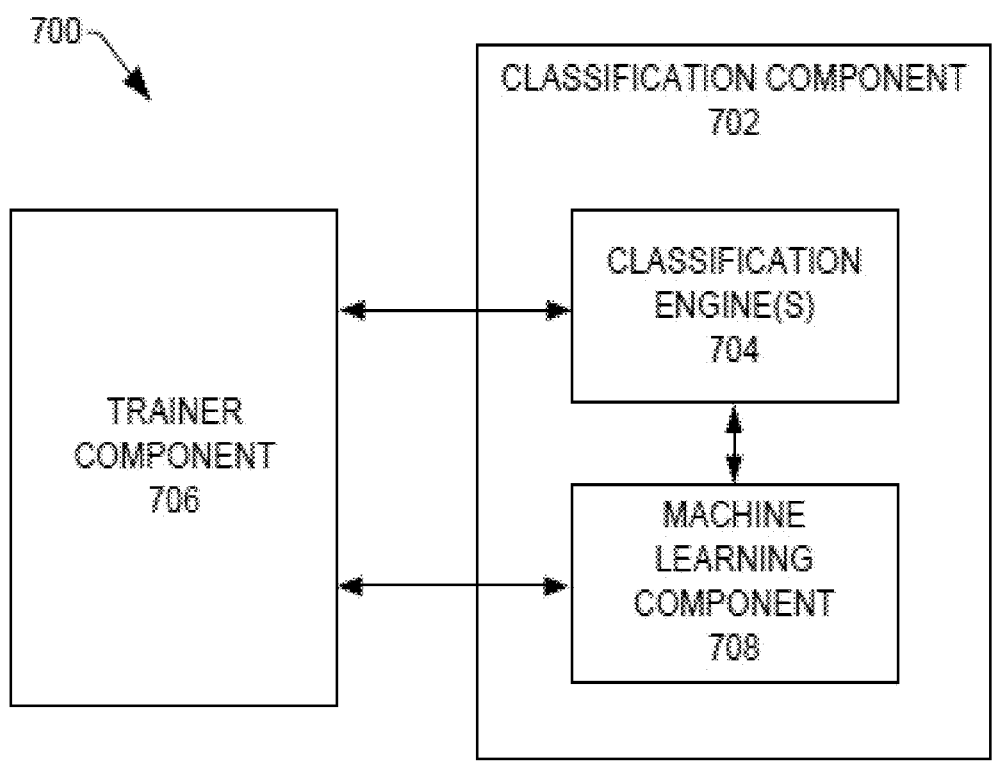
FIG. 7 depicts a block diagram of an example system for training a classification component to classify touch or hover interactions of objects with the touch sensitive surface in accordance with one embodiment of the present invention.

Turning to FIG. 7, FIG. 7 depicts a block diagram of an example system 700 that can train a classification component (e.g., one or more classification engines of the classification component) to classify touch or hover interactions of objects with the touch sensitive surface of a touch sensitive device, in accordance with various aspects and embodiments of the disclosed subject matter. The system 700 can comprise a classification component 702 that can include one or more classification engines, such as classification engine 704. The classification component 702, employing the classification engine(s) 704, can classify touch or hover interactions of objects with the touch sensitive surface of the touch sensitive device, based at least in part on the results of the classification component 702 analyzing sensor data received from one or more sensors of the sensor component of the touch sensitive device, such as more fully described herein.

In accordance with various embodiments, to facilitate determining classifications of touch or hover interactions of objects with the touch sensitive surface, the classification component 702 (e.g., the classification engine(s) 704 of the classification component 702) can use any number of approaches, including, but not limited to, basic heuristics, decision trees, a Support Vector Machine, Random Forest, naïve Bayes, elastic matching, dynamic time warping, template matching, k-means clustering, K-nearest neighbors algorithm, neural networks, Multilayer perceptron, logistic regression (e.g., multinomial logistic regression), gaussian mixture models, and/or AdaBoost.

The system 700 also can comprise a trainer component 706 that can be associated with (e.g., communicatively connected to) the classification component 702 to the train the classification component 702, including the classification engine(s) 704, to identify, determine, and/or distinguish between different types of touch or hover interactions of objects with the touch sensitive surface of the touch sensitive device based at least in part on the results of analyzing touch surface data, ultrasound data, and/or the other sensor data (e.g., accelerometer data, gyroscope data, IMU data, and/or other type of sensor data) associated with the touch sensitive device. In some embodiments, the classification component 702 can comprise a machine learning component 708 that can be associated with the classification engine(s) 704, wherein the machine learning component 708 can be utilized to facilitate training the classification component 702, including the classification engine(s) 704, to identify, determine, and/or distinguish between different types of touch or hover interactions of objects with the touch sensitive surface of the device.

In some embodiments, the trainer component 706, employing desired machine learning techniques and algorithms, can apply training information relating to touch and hover interactions of objects with a touch sensitive surface to the machine learning component 708, wherein the classification component 702, including the classification engine(s) 704, can be trained to identify, determine, and/or distinguish between different types of touch or hover interactions of objects with the touch sensitive surface based at least in part on training information.

For instance, the trainer component 706 can apply positive examples of sensor data (e.g., touch surface data, ultrasound data, accelerometer data, gyroscope data, and/or IMU data, . . . ) relating to intentional finger(s) touch interactions (e.g., single-point finger contacts, multi-point finger contacts) or finger(s) hover interactions (e.g., hovering finger(s) associated with an impending intentional touch interaction) with the touch sensitive surface of the touch sensitive device and positive examples of sensor data relating to unintentional touch or hover interactions of an object (e.g., unintentional finger(s) touch or hover interactions, unintentional ear or face touch or hover interactions, unintentional palm touch or hover interactions, . . . ) with the touch sensitive surface to the machine learning component 708 to train the classification engine(s) 704 to identify and distinguish between various different types of touch or hover interactions of objects with the touch sensitive surface.

The positive examples of the sensor data relating to touch and hover interactions can comprise, for example, positive examples of patterns of touch or hover interactions relating to intentional finger(s) touch interactions or hover interactions (associated with an intentional impending finger(s) touch interaction) with the touch sensitive surface and positive examples of patterns of touch or hover interactions relating to unintentional touch or hover interactions (e.g., unintentional finger touch or hover interactions, unintentional ear or face touch or hover interactions, or unintentional palm touch or hover interactions) with the touch sensitive surface.

In certain embodiments, the classification engine(s) 704 can be updated and refined (e.g., automatically or dynamically update and refined) over time to enhance classifications of touch or hover interactions of objects with the touch sensitive surface. For example, the machine learning component 708 can receive, from the trainer component 706, updates (e.g., updates of training information) relating to classifications of touch or hover interactions to apply to the classification engine(s) 704 to refine and enhance classifications of touch or hover interactions of objects with the touch sensitive surface by the classification engine(s) 704. In some embodiments, during operation of the touch sensitive device, the machine learning component 708 can train, update, refine, and/or enhance (e.g., automatically or dynamically train, update, refine, and/or enhance) the classification engine(s) 704 to refine and further improve classifications of touch or hover interactions of objects with the touch sensitive surface by the classification engine(s) 704.

In some embodiments, to facilitate classifying the touch or hover interaction of the object with the touch sensitive surface, the classification component can extract features from the ultrasound data, touch surface data, and/or other sensor data based at least in part on the analysis results. The features can comprise, for example, characteristics, shapes, dimensions, spectral centroid, spectral density, spherical harmonics, total average spectral energy, log spectral band ratios, and/or other features related to the contact or hovering of the object with the touch sensitive surface, with respect to the time domain or frequency domain, respectively.

In certain embodiments, the classification component can generate a representational image (e.g., frame image) of (e.g., corresponding to) the respective features based at least in part on (e.g., from) the respective features extracted from the ultrasound data, touch surface data, and/or other sensor data. The representational image can be or comprise a pattern relating to (e.g., representing or corresponding to) the touch or hover interaction of the object with the touch sensitive surface.

As another example, with regard to ultrasound data, the set of items of training information can comprise a first subset of items of training information regarding respective audio signals of respective first frequency distributions, a second subset of items of training information regarding respective reflected audio signals of respective second frequency distributions, and/or a third subset of items of training information regarding respective distributions of frequency shifts that relate to, and/or can be derived or obtained from, respective differences between the respective audio signals and the respective reflected audio signals. The trainer component can map respective items of the first subset, respective items of the second subset, and/or respective items of the third subset to each other, and can utilize such mapping to facilitate training the classification component and/or can provide such mapping to the classification component (e.g., to the machine learning component of or associated with the classification component). For example, the trainer component can map a first frequency distribution of a training audio signal (e.g., an audio signal that can be emitted from the device) to a second frequency distribution of a training reflected audio signal that can be obtained when the training audio signal is reflected off of a particular object (e.g., a finger, or an ear) with a particular movement status in relation to the touch sensitive surface (e.g., moving towards the touch sensitive surface, or moving away from the touch sensitive surface, or not moving in relation to the touch sensitive surface) and to a training distribution of frequency shifts that can be determined, derived, or obtained based at least in part on the training audio signal and the training reflected audio signal (e.g., the difference between the first frequency distribution of the training audio signal and the second frequency distribution of the training reflected audio signal).

In some embodiments, the training data, comprising a set of items of training information, can be applied to the classification component to facilitate the training of the classification component with regarding to classifying touch or hover interactions of objects with the touch sensitive surface. The classification component can be trained based at least in part on the applying of the training data to the classification component. The trainer component can apply the training data, comprising the set of items of training information, to the classification component (e.g., to the one or more classification engines, using the machine learning component), and the classification component (e.g., the one or more classification engines) can be trained based at least in part on the applying of the training data to the classification component and the use of machine learning techniques and algorithms, such as described herein. The classification component, employing the machine learning component (and the machine learning techniques and algorithms, such as disclosed herein), can desirably (e.g., suitably, acceptably, accurately, or optimally) determine classifications of touch or hover interactions of objects with the touch sensitive surface of the touch sensitive device.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

With regard to the methods and/or flow diagrams described herein, for simplicity of explanation, the methods have been depicted and described as a series of acts. It is to be understood and appreciated that the disclosed subject matter is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed herein and throughout this specification are capable of being stored on an article of manufacture to facilitate transporting and transferring such methods to computers. The term article of manufacture, as used herein, is intended to encompass a computer program accessible from any computer-readable device or storage media.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the disclosed methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," "unit," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

Although the foregoing invention has been described in some detail for purposes of clarity of understanding, it will be apparent that certain changes and modifications may be practiced within the scope of the appended claims. It should be noted that there are many alternative ways of implementing the processes, systems, and apparatus of the present invention. Accordingly, the present embodiments are to be considered as illustrative and not restrictive, and the invention is not to be limited to the details given herein.

What is claimed is:

1. A method of enhancing operation of an ultrasonic sensing device for determining the status of an object near the ultrasonic sensing device, the method comprising:
   from the ultrasonic sensing device, emitting an emission signal having a current frequency or a current band in an ultrasonic frequency range and receiving and analyzing ultrasonic signals to detect one or more objects near or contacting the ultrasonic sensing device;
   after expiration of a predefined time period of emitting the emission signal, halting the emitting of the emission signal and then detecting a background noise signal emitted or diffracted from one or more objects in an environment outside of the ultrasonic sensing device and estimating background noise metrics based on the background noise signal;
   determining whether the current frequency or band of the emission signal is optimized based on the background noise metrics, wherein the current frequency or band is determined to not be optimized when the background noise metrics includes a relatively strong amplitude, as compared to other amplitudes of the background noise metrics, at or near the current frequency or band so that the received ultrasonic signals for detecting one or more objects would be obscured by the background noise signal at such current frequency;
   selecting a next frequency or a next band, which differs from the current frequency or band, and emitting the emission signal at the next frequency or band if the current frequency or band is determined to not be optimum; and
   repeating the detecting, estimating, determining, and selecting after each time a next frequency or band is selected and the emission signal is emitted at the next frequency or band.

2. The method of claim 1, wherein the next frequency or band is selected to correspond to a frequency or band of the noise metrics that has a minimal amplitude.

3. The method of claim 1, wherein the background noise signal is detected after a time period corresponding to how long the emission signal takes to be eliminated from the environment after the halting of emission so that the emission signal does not affect the estimating of the background noise metrics.

4. The method of claim 3, wherein the estimating of the background noise metrics includes representing the background noise signal in a frequency domain to obtain frequency components of the background noise signal, the method further comprising:
   restarting the emitting of the emission signal; and
   subtracting one or more frequency components from the ultrasonic signals that are received prior to analyzing the ultrasonic signals to detect the one or more objects near or contacting the ultrasonic sensing device.

5. The method of claim 1, wherein the predefined time period corresponds to an average or mean time period between changes in a frequency profile of the background noise metrics.

6. The method of claim 5, wherein the changes in the frequency profile correspond to scheduled operation and shutdown time periods for nearby machinery.

7. The method of claim 1, further comprising:
periodically measuring one or more environment parameters, and
dynamically adjusting the predefined time period to expire when the one or more measured environment parameters have a value that will likely significantly affect a frequency response of the background noise signal or the emission signal.

8. The method of claim 1, wherein at least one of the estimating,
determining, or selecting is based on parameter input, including one or more frequency response curves for one or more types of measured parameters.

9. The method of claim 1, wherein the ultrasonic sensing device is part of a system having a touch sensitive surface, the method further comprising:
detecting, by the ultrasonic sensing device, a reflected ultrasonic signal comprising at least a second frequency, wherein the reflected ultrasonic signal is reflected off of an object in proximity to the touch sensitive screen to produce the reflected ultrasonic signal; and
determining, by the ultrasonic sensing device, a movement status of the object in relation to the touch sensitive screen, based at least in part on a frequency shift between the current frequency of the emission signal and the second frequency of the reflected ultrasonic signal, to facilitate classifying an interaction of the object with the touch sensitive screen.

10. The method of claim 9, further comprising:
receiving, by the system, sensor data from at least two of a touch sensor associated with the touch sensitive screen, an ultrasonic sensor associated with the ultrasonic sensing device, an audio sensor, an accelerometer, a gyroscope, or an inertial measurement unit, wherein the sensor data comprises the reflected ultrasonic signal received from the ultrasonic sensor and at least one of an audio signal received from the audio sensor, touch surface data received from the touch sensor, accelerometer data received from the accelerometer, gyroscope data received from the gyroscope, or inertial measurement data received from the inertial measurement unit;
analyzing the sensor data; and
classifying, by the system, the interaction of the object with the touch sensitive screen based at least in part on a result of the analyzing of the sensor data, wherein the result comprises information relating to the frequency shift between the current frequency of the emission signal and the second frequency of the reflected ultrasonic signal that indicates the movement status of the object in relation to the touch sensitive screen.

11. An ultrasonic sensing system, comprising:
at least one speaker configured to emit an emission signal having a current frequency or band in an ultrasonic frequency range;
at least one audio sensor configured to sense ultrasonic signals for detecting one or more objects near or contacting the ultrasonic sensing system;
a memory that stores executable components; and
a processor, operatively coupled to the memory, that executes the executable components to perform the following operations:
after expiration of a predefined time period of emitting the emission signal, halting emitting of the emission signal and then detecting a background noise signal emitted or diffracted from one or more objects in an environment outside of the ultrasonic sensing device and estimating background noise metrics based on the background noise signal;
determining whether the current frequency or band of the emission signal is optimized based on the background noise metrics, wherein the current frequency or band is determined to not be optimized when the background noise metrics includes a relatively strong amplitude, as compared to other amplitudes of the background noise metrics, at or near the current frequency or band so that the received ultrasonic signals for detecting one or more objects would be obscured by the background noise signal at such current frequency;
selecting a next frequency or a next band, which differs from the current frequency or band, and emitting the emission signal at the next frequency or band if the current frequency or band is determined to not be optimum; and
repeating the operations of detecting, estimating, determining, and selecting after each time a next frequency or band is selected and the emission signal is emitted at the next frequency or band.

12. The system of claim 11, wherein the next frequency or band is selected to correspond to a frequency or band of the noise metrics that has a minimal amplitude.

13. The system of claim 11, wherein the background noise signal is detected after a time period corresponding to how long the emission signal takes to be eliminated from the environment after the halting of emission so that the emission signal does not affect the estimating of the background noise metrics.

14. The system of claim 13, wherein the estimating of the background noise includes representing the background noise signal in a frequency domain to obtain frequency components of the background noise signal, wherein the processor is further configured for:
restarting the emitting of the emission signal; and
subtracting one or more frequency components from the ultrasonic signals that are received prior to analyzing the ultrasonic signals to detect the one or more objects near or contacting the ultrasonic sensing system.

15. The system of claim 11, wherein the predefined time period corresponds to an average or mean time period between changes in a frequency profile of the background noise metrics.

16. The system of claim 15, wherein the changes in the frequency profile correspond to scheduled operation and shutdown time periods for nearby machinery.

17. The system of claim 11, wherein the processor is further configured for:
periodically measuring one or more environment parameters, and
dynamically adjusting the predefined time period to expire when the one or more measured environment parameters have a value that will likely significantly affect a frequency response of the background noise signal or the emission signal.

18. The system of claim 11, wherein at least one of the estimating, determining, or selecting is based on parameter input, including one or more frequency response curves for one or more types of measured parameters.

19. The system of claim 11, wherein the ultrasonic sensing system is part of a system having a touch sensitive surface, wherein the processor is further configured for:
- detecting, by the ultrasonic sensing system, a reflected ultrasonic signal comprising at least a second frequency, wherein the reflected ultrasonic signal is reflected off of an object in proximity to the touch sensitive screen to produce the reflected ultrasonic signal; and
- determining, by the ultrasonic sensing system, a movement status of the object in relation to the touch sensitive screen, based at least in part on a frequency shift between the current frequency of the emission signal and the second frequency of the reflected ultrasonic signal, to facilitate classifying an interaction of the object with the touch sensitive screen.

20. The system of claim 19, wherein the processor is further configured for:
- receiving, by the system, sensor data from at least two of a touch sensor associated with the touch sensitive screen, an ultrasonic sensor associated with the ultrasonic sensing system, an audio sensor, an accelerometer, a gyroscope, or an inertial measurement unit, wherein the sensor data comprises the reflected ultrasonic signal received from the ultrasonic sensor and at least one of an audio signal received from the audio sensor, touch surface data received from the touch sensor, accelerometer data received from the accelerometer, gyroscope data received from the gyroscope, or inertial measurement data received from the inertial measurement unit;
- analyzing the sensor data; and
- classifying, by the system, the interaction of the object with the touch sensitive screen based at least in part on a result of the analyzing of the sensor data, wherein the result comprises information relating to the frequency shift between the current frequency of the emission signal and the second frequency of the reflected ultrasonic signal that indicates the movement status of the object in relation to the touch sensitive screen.

21. A machine-readable medium, comprising executable instructions that, when executed by a processor, facilitate performance of operations, comprising:
- from an ultrasonic sensing device, emitting an emission signal having a current frequency or a current band in an ultrasonic frequency range and receiving and analyzing ultrasonic signals to detect one or more objects near or contacting the ultrasonic sensing device;
- after expiration of a predefined time period of emitting the emission signal, halting emitting of the emission signal and then detecting a background noise signal emitted or diffracted from one or more objects in an environment outside of the ultrasonic sensing device and estimating background noise metrics based on the background noise signal;
- determining whether the current frequency of the emission signal is optimized based on the background noise metrics, wherein the current frequency or band is determined to not be optimized when the background noise metrics includes a relatively strong amplitude, as compared to other amplitudes of the background noise metrics, at or near the current frequency or band so that the received ultrasonic signals for detecting one or more objects would be obscured by the background noise signal at such current frequency;
- selecting a next frequency or a next band, which differs from the current frequency or band, and emitting the emission signal at the next frequency or band if the current frequency or band is determined to not be optimum; and
- repeating the detecting, estimating, determining, and selecting after each time a next frequency or band is selected and the emission signal is emitted at the next frequency or band.

* * * * *